US012340579B2

(12) United States Patent
Nakagawa

(10) Patent No.: US 12,340,579 B2
(45) Date of Patent: Jun. 24, 2025

(54) IMAGE CONTENT DETERMINATION DEVICE, IMAGE CONTENT DETERMINATION METHOD, AND IMAGE CONTENT DETERMINATION PROGRAM

(71) Applicant: FUJIFILM Corporation, Tokyo (JP)

(72) Inventor: Tomohiro Nakagawa, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/932,281

(22) Filed: Sep. 14, 2022

(65) Prior Publication Data

US 2023/0010748 A1    Jan. 12, 2023

Related U.S. Application Data

(63) Continuation of application No. PCT/JP2020/047780, filed on Dec. 21, 2020.

(30) Foreign Application Priority Data

Mar. 27, 2020  (JP) .................................. 2020-058617

(51) Int. Cl.
*G06V 20/30* (2022.01)
*G06V 10/74* (2022.01)
(Continued)

(52) U.S. Cl.
CPC ............ *G06V 20/30* (2022.01); *G06V 10/761* (2022.01); *G06V 10/764* (2022.01); *G06V 20/63* (2022.01);
(Continued)

(58) Field of Classification Search
CPC ........ G06V 20/30; G06V 30/10; G06V 20/70; G06V 10/761; G06V 40/172; G06V 20/63; G06V 10/764
See application file for complete search history.

(56) References Cited

U.S. PATENT DOCUMENTS 9,373,076 B1    6/2016  Appelman et al.
9,704,026 B1 *  7/2017  Appelman .............. G06F 16/27
(Continued)

FOREIGN PATENT DOCUMENTS

CN     101504719 A    8/2009
JP     2008-131330 A   6/2008
(Continued)

OTHER PUBLICATIONS

International Search Report issued in PCT/JP2020/047780; mailed Mar. 23, 2021.
(Continued)

*Primary Examiner* — Lixi C Simpson
(74) *Attorney, Agent, or Firm* — Studebaker Brackett PLLC

(57) ABSTRACT

An image content determination device includes at least one processor, in which the processor is configured to execute first recognition processing of recognizing a character and a face of a first person from a first image including the character and the face of the first person, execute first acquisition processing of acquiring first person-related information related to the first person included in the first image based on the recognized character and face of the first person, execute second recognition processing of recognizing a face of a second person from a second image including the face of the second person, and execute second acquisition processing of acquiring second person-related information related to the second person included in the second image, in which the second person-related information is acquired using the first person-related information corresponding to the first image including the face of the first person similar to the face of the second person.

17 Claims, 24 Drawing Sheets

(51) Int. Cl.
*G06V 10/764* (2022.01)
*G06V 20/62* (2022.01)
*G06V 20/70* (2022.01)
*G06V 30/10* (2022.01)
*G06V 40/16* (2022.01)

(52) U.S. Cl.
CPC .............. *G06V 20/70* (2022.01); *G06V 30/10* (2022.01); *G06V 40/172* (2022.01)

(56) References Cited

U.S. PATENT DOCUMENTS

| | | | |
|---|---|---|---|
| 10,541,999 B1 * | 1/2020 | Rosenberg | G06V 40/172 |
| 2006/0251338 A1 * | 11/2006 | Gokturk | G06F 16/5854 707/E17.022 |
| 2009/0196467 A1 | 8/2009 | Okubo | |
| 2010/0232656 A1 | 9/2010 | Ryu | |
| 2011/0038512 A1 | 2/2011 | Petrou et al. | |
| 2011/0038550 A1 * | 2/2011 | Obrador | G06F 16/54 382/225 |
| 2012/0054691 A1 * | 3/2012 | Nurmi | G06F 16/951 715/854 |
| 2012/0158700 A1 | 6/2012 | Dodson et al. | |
| 2014/0010463 A1 | 1/2014 | Kato et al. | |
| 2017/0318077 A1 | 11/2017 | Borse et al. | |
| 2020/0234076 A1 * | 7/2020 | Katsumata | G06V 20/30 |

FOREIGN PATENT DOCUMENTS

| | | |
|---|---|---|
| JP | 2009-526302 A | 7/2009 |
| JP | 2010-067014 A | 3/2010 |
| JP | 2013-501978 A | 1/2013 |
| JP | 2014-016785 A | 1/2014 |
| JP | 2014-174782 A | 9/2014 |
| JP | 2016-173797 A | 9/2016 |
| JP | 2018-025966 A | 2/2018 |
| JP | 2018-109935 A | 7/2018 |
| WO | 2016/131083 A1 | 8/2016 |

OTHER PUBLICATIONS

International Preliminary Report On Patentability (Chapter I) and Written Opinion of the International Searching Authority issued in PCT/JP2020/047780; issued Sep. 22, 2022.

An Office Action mailed by the Japanese Patent Office on Oct. 24, 2023, which corresponds to Japanese Patent Application No. 2022-509272 and is related to U.S. Appl. No. 17/932,281.

An Office Action; "Notice of Reasons for Refusal," mailed by the Japanese Patent Office on Feb. 20, 2024, which corresponds to Japanese Patent Application No. 2022-509272 and is related to U.S. Appl. No. 17/932,281; with English language translation.

An Office Action; mailed by the China National Intellectual Property Administration of the People's Republic of China on Apr. 23, 2025, which corresponds to Chinese Patent Application No. 202080098630.0 and is related to U.S. Appl. No. 17/932,281.

* cited by examiner

FIG. 7

| | ACCESSORY INFORMATION | FIRST FACE IMAGE | IMAGING SCENE | CHARACTER STRING CH | PRIMARY INFORMATION AND FIRST PERSON-RELATED INFORMATION R1 |
|---|---|---|---|---|---|
| P1-1 | PF1 — M1A | | PORTRAIT OUTDOOR PLACE | HAPPY NEW YEAR ... NEW YEAR'S DAY IN 2010 ...OO-KU TOKYO-TO TARO YAMADA | INFORMATION ON JANUARY 1, 2010 TYPE: NEW YEAR'S CARD<br>FIRST PERSON M1A  NAME: TARO YAMADA<br>  ADDRESS: ... TOKYO-TO<br>  PET IS DOG |
| P1-2 | PF1 M1A IMAGING DATE AND TIME: JANUARY 5, 2014 GPS INFORMATION: TOKYO | M1B | PORTRAIT INDOOR PLACE | A Happy New Year NEW YEAR'S DAY IN 2014 ...OO-KU TOKYO-TO TARO AND HANAKO YAMADA | INFORMATION ON JANUARY 1, 2014 TYPE: NEW YEAR'S CARD<br>FIRST PERSON M1A NAME: TARO YAMADA, ADDRESS: ... TOKYO<br>FIRST PERSON M1B NAME: HANAKO YAMADA, ADDRESS: ... TOKYO<br>RELATIONSHIP BETWEEN TWO (M1A AND M1B): MARRIED COUPLE |
| P1-3 | M1A IMAGING DATE AND TIME: JANUARY 7, 2015 GPS INFORMATION: TOKYO | M1B M1C | PORTRAIT OUTDOOR PLACE | NEW YEAR'S GREETING NEW YEAR'S DAY IN 2015 ...OO-KU TOKYO-TO TARO, HANAKO, AND ICHIRO YAMADA | INFORMATION ON JANUARY 1, 2015 TYPE: NEW YEAR'S CARD<br>FIRST PERSON M1A NAME: TARO YAMADA, ADDRESS: ...<br>FIRST PERSON M1B NAME: HANAKO<br>FIRST PERSON M1C NAME: ICHIRO<br>RELATIONSHIP BETWEEN TWO (M1A AND M1B): MARRIED COUPLE<br>RELATIONSHIP AMONG THREE (M1A, M1B, AND M1C): PARENT AND CHILD |
| P1-4 | M1A PF1 — | M1B M1C | PORTRAIT OUTDOOR PLACE | HAPPY NEW YEAR ... NEW YEAR'S DAY IN 2020 ...OO-KU TOKYO-TO TARO, HANAKO, AND ICHIRO YAMADA | INFORMATION ON JANUARY 1, 2020 TYPE: NEW YEAR'S CARD<br>FIRST PERSON M1A NAME: TARO YAMADA, ADDRESS: ...<br>FIRST PERSON M1B NAME: HANAKO<br>FIRST PERSON M1C NAME: ICHIRO<br>RELATIONSHIP BETWEEN TWO (M1A AND M1B): MARRIED COUPLE<br>RELATIONSHIP AMONG THREE (M1A, M1B, AND M1C): PARENT AND CHILD |

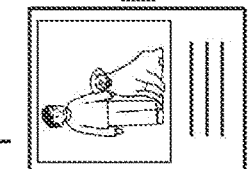
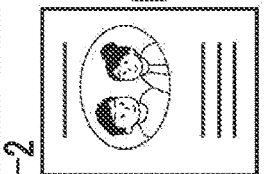
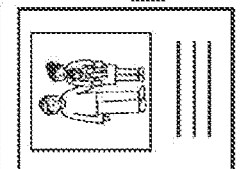
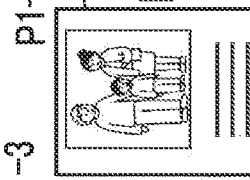

FIG. 9

IMAGE CONTENT DETERMINATION DEVICE, IMAGE CONTENT DETERMINATION METHOD, AND IMAGE CONTENT DETERMINATION PROGRAM

CROSS-REFERENCE TO RELATED APPLICATIONS

This application is a continuation application of International Application No. PCT/JP2020/047780, filed Dec. 21, 2020, the disclosure of which is incorporated herein by reference in its entirety. Further, this application claims priority under 35 USC 119 from Japanese Patent Application No. 2020-058617 filed Mar. 27, 2020, the disclosure of which is incorporated by reference herein.

BACKGROUND

1. Technical Field

The disclosed technology relates to an image content determination device, an image content determination method, and an image content determination program.

2. Related Art

In recent years, an online storage service for storing data of images such as photos owned by a user in a distributable manner via a network has been known. The user can download and view images stored in a storage using a portable terminal and/or a personal computer (PC).

In such an online storage service, tag information that enables a keyword search is assigned to the images stored in the storage so that the user easily searches for an image to view from a large quantity of images stored in the storage (JP2009-526302A and JP2010-067014A).

In JP2009-526302A and JP2010-067014A, for example, a technology for copying, in a case where each of two images includes a face of a person and tag information such as a name of the person is assigned to one image by an input of the user, the tag information assigned to the one image to the other image based on a similarity between the faces included in the two images is disclosed.

SUMMARY

However, in the technology disclosed in JP2009-526302A and JP2010-067014A, the input of the tag information by the user in advance is necessary for the image from which the tag information is copied. Thus, a problem of requiring an effort of the user arises. For example, checking an image content while viewing the images one by one and assigning tag information corresponding to the checked image content are complicated for the user in a case where the number of images is large.

Therefore, as a method of assigning the tag information to the images without requiring the effort of the user, a method of determining the image content by performing image analysis and assigning the tag information based on a determination result is considered. As a method of determining the image content using the image analysis, for example, a method of estimating an age of the person included in the image or estimating, in a case where a plurality of persons are included in the image, a relationship (family relationship or the like) of each person from the estimated age of each person is considered.

However, determination accuracy of the image content by the image analysis is limited. Thus, in a case of estimating information related to the person included in the image, simply performing the image analysis using only the data of the image as a determination target of the image content has a problem of low reliability of the information obtained by estimation.

In view of the above problems, one embodiment according to the disclosed technology provides an image content determination device, an image content determination method, and an image content determination program that can acquire information of high reliability as information related to a person included in an image without requiring an effort of a user.

An image content determination device according to an aspect of the present disclosure comprises at least one processor, in which the processor is configured to execute first recognition processing of recognizing a character and a face of a first person from a first image including the character and the face of the first person, execute first acquisition processing of acquiring first person-related information related to the first person included in the first image based on the recognized character and face of the first person, execute second recognition processing of recognizing a face of a second person from a second image including the face of the second person, and execute second acquisition processing of acquiring second person-related information related to the second person included in the second image, in which the second person-related information is acquired using the first person-related information corresponding to the first image including the face of the first person similar to the face of the second person.

An operation method of an image content determination device according to another aspect of the present disclosure is an operation method of an image content determination device including at least one processor, the operation method comprising, by the processor, executing first recognition processing of recognizing a character and a face of a first person from a first image including the character and the face of the first person, executing first acquisition processing of acquiring first person-related information related to the first person included in the first image based on the recognized character and face of the first person, executing second recognition processing of recognizing a face of a second person from a second image including the face of the second person, and executing second acquisition processing of acquiring second person-related information related to the second person included in the second image, in which the second person-related information is acquired using the first person-related information corresponding to the first image including the face of the first person similar to the face of the second person.

An operation program of an image content determination device according to still another aspect of the present disclosure is an operation program causing a computer including at least one processor to function as an image content determination device, the operation program causing the processor to execute a process comprising executing first recognition processing of recognizing a character and a face of a first person from a first image including the character and the face of the first person, executing first acquisition processing of acquiring first person-related information related to the first person included in the first image based on the recognized character and face of the first person, executing second recognition processing of recognizing a face of a second person from a second image including the face of the second person, and executing second acquisition processing of acquiring second person-related information related to the second person included in the second image, in which the second person-related information is acquired using the first person-related information corresponding to the first image including the face of the first person similar to the face of the second person.

BRIEF DESCRIPTION OF THE DRAWINGS

Exemplary embodiments of the technology of the disclosure will be described in detail based on the following figures, wherein:

FIG. 7 is a table illustrating an example of a first image information list;

FIG. 9 is a table illustrating an example of a second image information list;

DETAILED DESCRIPTION

First Embodiment

Figure 1:
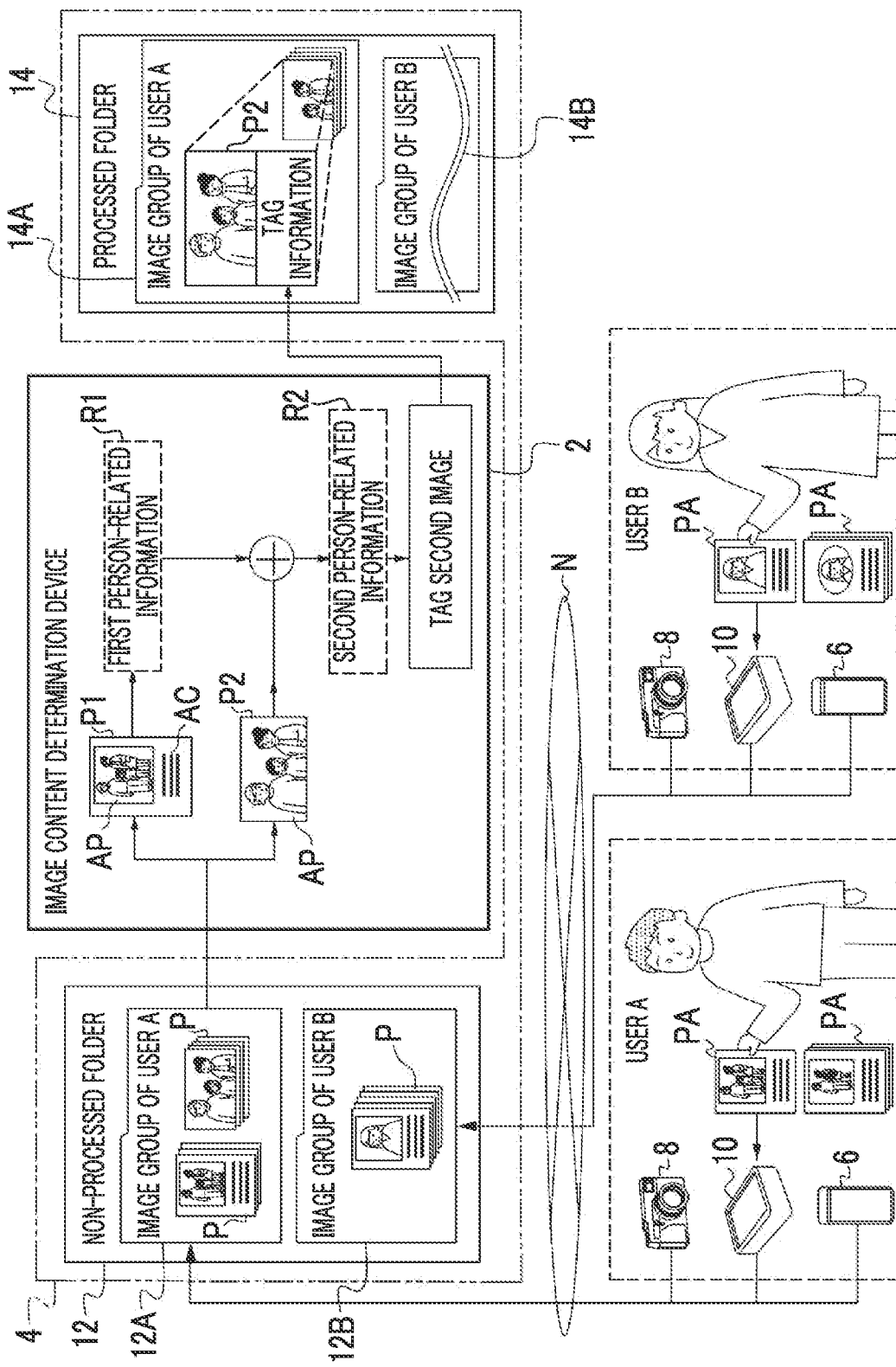
FIG. 1 is a description diagram illustrating a summary of an online storage service.

In FIG. 1, an image content determination device 2 that is an example according to an embodiment of the disclosed technology constitutes a part of an image distribution system. The image distribution system is a system that stores images P of a plurality of users such as a user A and a user B in a storage 4 and distributes the stored images P through a communication network N in accordance with a request from each user. The images P are digital data such as photos owned by each user. From a viewpoint of the users, a service provided by the image distribution system is a service for storing images in the storage 4 through the communication network N and thus, is referred to as an online storage service or the like. In using the image distribution system, each user signs a use contract with a business operator who operates the image distribution system. For the user who signs the use contract, for example, an account for each user is created, and a storage region in which the image P of each user is stored in the storage 4 is allocated. In signing the use contract, the business operator is provided with personal information such as a name and a date of birth of the user and registers the acquired personal information as account information of the user.

The storage 4 is a data storage device such as a hard disk drive or a solid state drive. The storage 4 is communicably connected to the image content determination device 2 and also functions as an external storage of the image content determination device 2. The storage 4 may be connected to the image content determination device 2 through a network, and the network may be a wide area network (WAN) such as the Internet or a local area network (LAN) such as Wifi (registered trademark). In addition, the connection between the network and the image content determination device 2 may be wired or wireless. Furthermore, the storage 4 may be a recording medium directly connected to the image content determination device 2 through a universal serial bus (USB) or the like or may be incorporated in the image content determination device 2. The storage 4 is not limited to a single device and may be composed of a plurality of devices for each data and/or each capacity.

For example, each user including the user A and the user B launches an application for the online storage service installed on a smart device 6 and uploads image data of a photo captured by the smart device 6 to the storage 4 through the communication network N. In addition, each user can access the online storage service through a PC. Each user uploads image data of a photo captured by a digital camera 8 to the storage 4 through the PC. Furthermore, each user can read a printed photo PA by a scanner 10 and upload digitized image data to the storage 4 through the PC or the smart device 6. The printed photo PA may be digitized by an imaging function of the smart device 6 or the digital camera 8 instead of being digitized by the scanner 10.

The printed photo PA also includes a greeting card created by each user. Examples of the greeting card include a New Year's card, a Christmas card, a summer greeting card, and a winter greeting card. The digitization of the printed photo PA may be entrusted to the business operator of the online storage service instead of causing the user to digitize the printed photo PA and upload the digitized printed photo PA to the storage 4.

The image data uploaded by each user is stored in the storage 4 as the image P. The image content determination device 2 tags the image P uploaded to the storage 4. For example, a non-processed folder 12 in which the image P not tagged yet is stored, and a processed folder 14 in which the tagged image P is stored are provided in the storage 4.

In the non-processed folder 12, for example, a dedicated folder such as a user A dedicated folder 12A and a user B dedicated folder 12B is provided for each user, and the image P owned by each user is stored in each user dedicated folder. The image data uploaded by the user A is stored in the user A dedicated folder 12A provided in the non-processed folder 12. The image data uploaded by the user B is stored in the user B dedicated folder 12B provided in the non-processed folder 12.

The image content determination device 2 is a device that determines a content of the image P using image analysis technology such as face recognition, character recognition, and imaging scene determination. Furthermore, the image content determination device 2 of the present example performs tagging of assigning a determination result of the content of the image P to the image P as tag information for searching for a keyword search of the image P.

In addition, the tag information assigned to the image P may be information other than the determination result of the content of the image P, for example, accessory information such as exchangeable image file format (EXIF) information of the image P. The EXIF information includes not only an imaging apparatus maker and a model name but also information such as an imaging date and time and global positioning system (GPS) information indicating an imaging location. The EXIF information is already recorded in the file of the image P as meta-information and can be used as a tag for searching.

The image content determination device 2 comprises a function of assigning information related to a person included in the image P as the tag information separately from the EXIF information by determining the content of the image P.

For example, in a case where the image P is a first image P1 such as a New Year's card, the New Year's card generally includes a family photo including faces of a plurality of persons constituting a family. Furthermore, the New Year's card includes characters of names of the plurality of persons constituting the family, a date, and the like. In a case where it can be determined that the first image P1 is a New Year's card, it can be estimated that a relationship among the plurality of persons included in the photo in the first image P1 is a family, and the names included in the first image P1 are names of the family Accordingly, in a greeting card such as a New Year's card, character information related to a person such as a name of the person is included in the image P in addition to a face of the person.

In addition, the image P includes not only an image including a face of a person and a character, such as the first image P1, but also an image including a face of a person and not including a character, such as a second image P2. The image content determination device 2 also estimates information related to a person included in the second image P2 by analyzing an image content of the second image P2 not including a character.

The image content determination device 2 has a function of using information related to a person obtained from the image P including a face of a person and a character, such as the first image P1, for analyzing the content of the second image P2 not including a character and including a face of a person. Hereinafter, this function will be mainly described.

For example, the image content determination device 2 determines the image content for each image group of each user. For example, in a case of determining the image content of the image group of the user A, the image content determination device 2 performs image content determination processing on the image P of the user A stored in the user A dedicated folder 12A of the non-processed folder 12.

The image P includes the first image P1 and the second image P2. The first image P1 is an image including a character and a face of a person. The person included in the first image P1 corresponds to a first person according to the embodiment of the disclosed technology. An example of the first image P1 is a character region-including image. The character region-including image is an image including a photo region AP in which the face of the first person is included, and a character region AC that is a blank outside an outline of the photo region AP and in which a character is arranged. The blank may be plain or may have a pattern or the like. A greeting card such as a New Year's card is generally the character region-including image.

The first image P1 of the present example is a New Year's card and is the character region-including image. Thus, the first image P1 is an image including the photo region AP in which faces of a plurality of first persons constituting a family are captured, and the character region AC in which characters of a New Year's greeting such as "Happy New Year", names of the family, an address, and the like are arranged in the blank outside the photo region AP.

The second image P2 is an image including a face of a person. The person included in the second image P2 corresponds to a second person according to the embodiment of the disclosed technology. An example of the second image P2 is a character region non-including image. The character region non-including image is an image of only the photo region AP in which the face of the second person is included. The second image P2 is an image that does not include, other than the photo region AP, the character region AC in which characters are arranged, except for a character captured in a background of the second person within the photo region AP in which the face of the second person is included.

The image content determination device 2 acquires first person-related information R1 related to the first person from the first image P1. In a case of determining the image content of the second image P2, the first image P1 that includes the first person similar to the second person included in the second image P2 is specified. The image content determination device 2 acquires second person-related information R2 related to the second person of the second image P2 based on the first person-related information R1 of the specified first image P1.

Furthermore, the image content determination device 2 performs tagging of assigning the tag information to the second image P2 based on the acquired second person-related information R2. The tagged second image P2 is stored in the processed folder 14. As an example, even in the processed folder 14, a dedicated folder is provided for each user. The second image P2 of the user A is stored in a user A dedicated folder 14A, and the second image P2 of the user B is stored in a user B dedicated folder 14B.

In FIG. 1, while only the second image P2 is stored in the processed folder 14, the first image P1 is also stored in the processed folder 14 in a case where the first image P1 is newly tagged as a result of acquiring the first person-related information R1 from the first image P1.

The tagged first image P1 and second image P2 of each user are stored in a folder distributable to each user and are used for viewing and the like of each user. At this point, each user can perform a keyword search or the like using the tag information.

Figure 2:
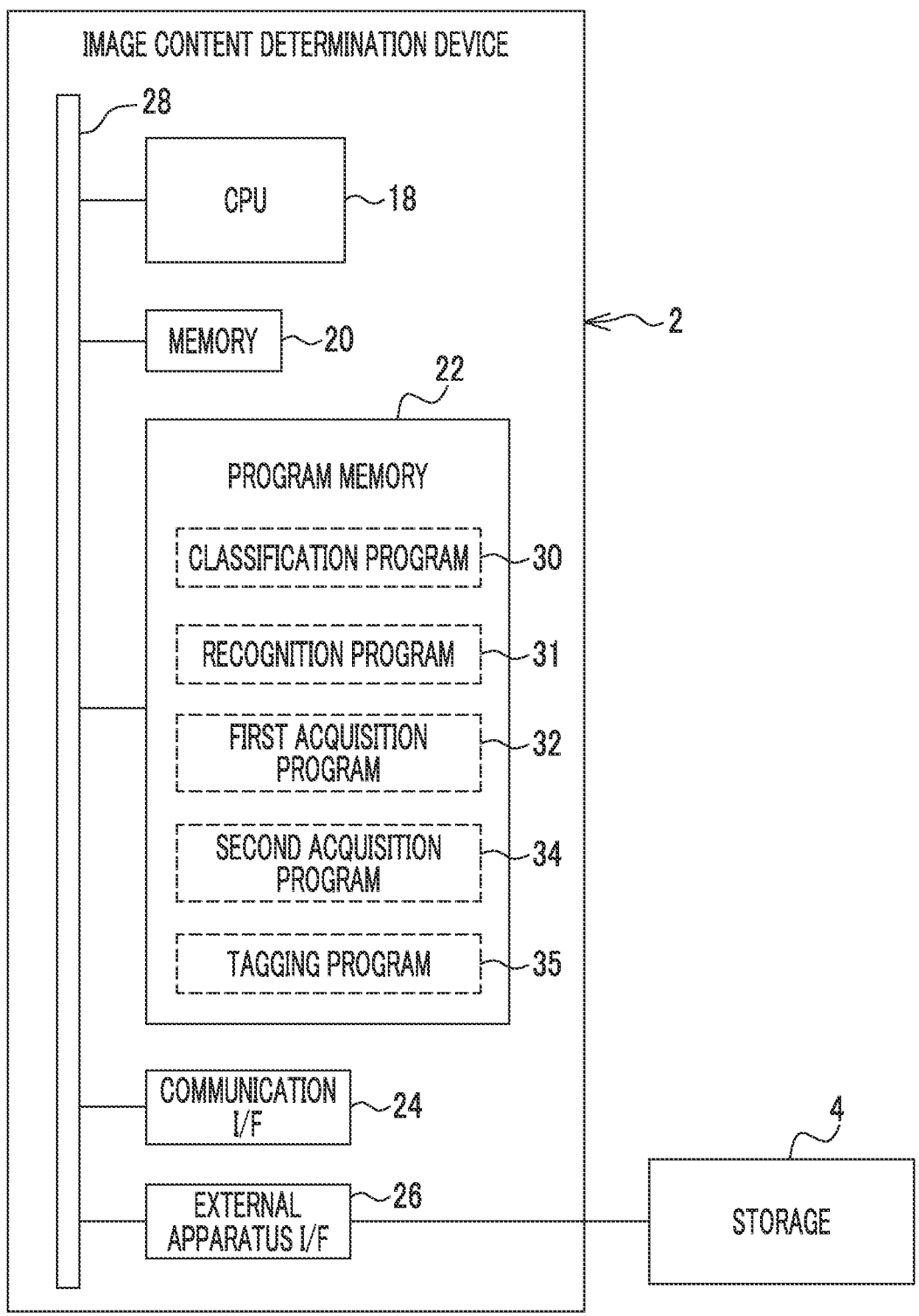
FIG. 2 is a block diagram of an image content determination device.

As illustrated in FIG. 2 as an example, a computer constituting the image content determination device 2 comprises a central processing unit (CPU) 18, a memory 20, a program memory 22, a communication I/F 24, and an external apparatus I/F 26. These units are connected to each other through a busline 28.

The storage 4 is communicably connected to the image content determination device 2 through the external apparatus I/F 26. For example, the computer constituting the image content determination device 2 and the storage 4 are arranged in a base of the business operator providing the online storage service together with other devices constituting the image distribution system. In addition, the communication I/F 24 is an interface that controls transmission of various information to external devices.

The program memory 22 stores a classification program 30, a recognition program 31, a first acquisition program 32, a second acquisition program 34, and a tagging program 35. Among these programs, the recognition program 31, the first acquisition program 32, and the second acquisition program 34 are programs causing the computer constituting the image content determination device 2 to operate as an "image content determination device" according to the embodiment of the disclosed technology. These programs are an example of an "image content determination program" according to the embodiment of the disclosed technology.

The memory 20 functions as a work memory for the CPU 18 to execute processing and a storage memory in which data such as dictionary data, described later, and a first image information list 48 and a second image information list 50, described later, necessary for the CPU 18 to execute processing are recorded. The CPU 18 loads the classification program 30, the recognition program 31, the first acquisition program 32, the second acquisition program 34, and the tagging program 35 stored in the program memory 22 into the memory 20.

Figure 3:
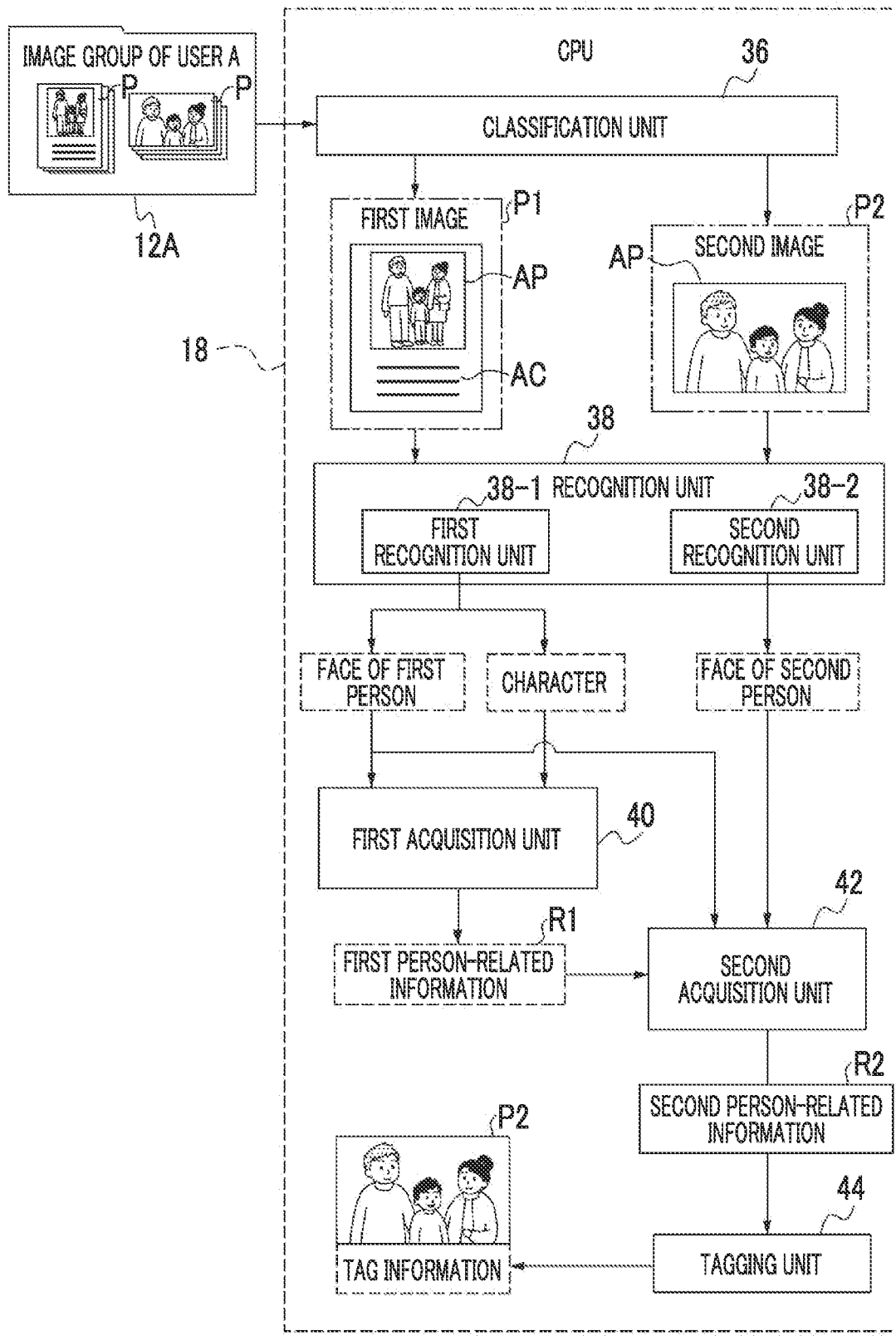
FIG. 3 is a function block diagram of a CPU comprised in the image content determination device.

As illustrated in FIG. 3 as an example, the CPU 18 functions as a classification unit 36, a recognition unit 38, a first acquisition unit 40, a second acquisition unit 42, and a tagging unit 44 by executing the classification program 30, the recognition program 31, the first acquisition program 32, the second acquisition program 34, and the tagging program 35 on the memory 20. The CPU 18 is an example of a "processor" according to the embodiment of the disclosed technology.

In the present example, an example of determining the content of the image P of the user A will be described as processing of the image content determination device 2. In FIG. 3, in a case of processing the image P of the user A, the classification unit 36 reads out the image P from the user A dedicated folder 12A. The classification unit 36 classifies the read image P into the first image P1 and the second image P2.

The recognition unit 38 includes a first recognition unit 38-1 and a second recognition unit 38-2. The first recognition unit 38-1 executes first recognition processing of recognizing a character and the face of the first person from the first image P1 including a character and the face of the first person. Specifically, the first recognition unit 38-1 recognizes the face of the first person included in the first image P1 from the photo region AP of the first image P1 and recognizes the character from the character region AC. The second recognition unit 38-2 executes second recognition processing of recognizing the face of the second person included in the second image P2 from the photo region AP of the second image P2.

The first acquisition unit 40 executes first acquisition processing of acquiring the first person-related information R1 included in the first image P1 based on the character and the face of the first person recognized by the first recognition unit 38-1.

The second acquisition unit 42 executes second acquisition processing of acquiring the second person-related information R2 related to the second person included in the second image P2, in which the second person-related information R2 is acquired using the first person-related information R1 corresponding to the first image P1 including the face of the first person similar to the face of the second person. The tagging unit 44 assigns the tag information to the second image P2 based on the second person-related information R2.

An example of classification processing performed by the classification unit 36 will be described with reference to FIG. 4. The classification unit 36 determines whether or not the photo region AP and the character region AC are included in the image P. For example, the classification unit 36 performs outline extraction on the image P using a method such as edge detection and detects the photo region AP and the character region AC from an extracted outline. In addition, each of the photo region AP and the character region AC has a feature amount distinguishable from other regions, such as features related to a pixel value of each pixel and arrangement of the pixel values. The classification unit 36 detects the photo region AP and the character region AC from the image P by looking into the feature amounts included in the image P. In a case where a character included in the image P is written by printing or using the same pen, it is considered that pixel values of pixels corresponding to the character included in the image P are similar within a constant range. Therefore, for example, pixels constituting the image P are analyzed in two-dimensional coordinates. In a case where a feature such that a pixel row having pixel values within a predetermined range of similarity is arranged in a predetermined width or larger in a first axis (X axis) and the pixel row is continuously arranged in a predetermined constant width or larger in a second axis (Y axis) is present, it may be determined that a character is present, and a region having the character may be determined as the character region AC.

The character included in the character region AC includes not only kanji, hiragana, katakana, and the alphabet but also numbers and symbols. The character is not limited to a font character defined by a font and includes a handwritten character. The recognition of the character included in the character region AC is performed using character recognition technology such as optical character recognition/reader (OCR). Character recognition technology using machine learning may also be used.

Furthermore, the classification unit 36 recognizes a face of a person from the photo region AP using face recognition technology such as outline extraction and pattern matching. Face recognition technology using machine learning may also be used. As an example, the classification unit 36 detects a face image PF showing the face recognized in the photo region AP and classifies the image P depending on whether or not the face image PF is present.

Figure 4:
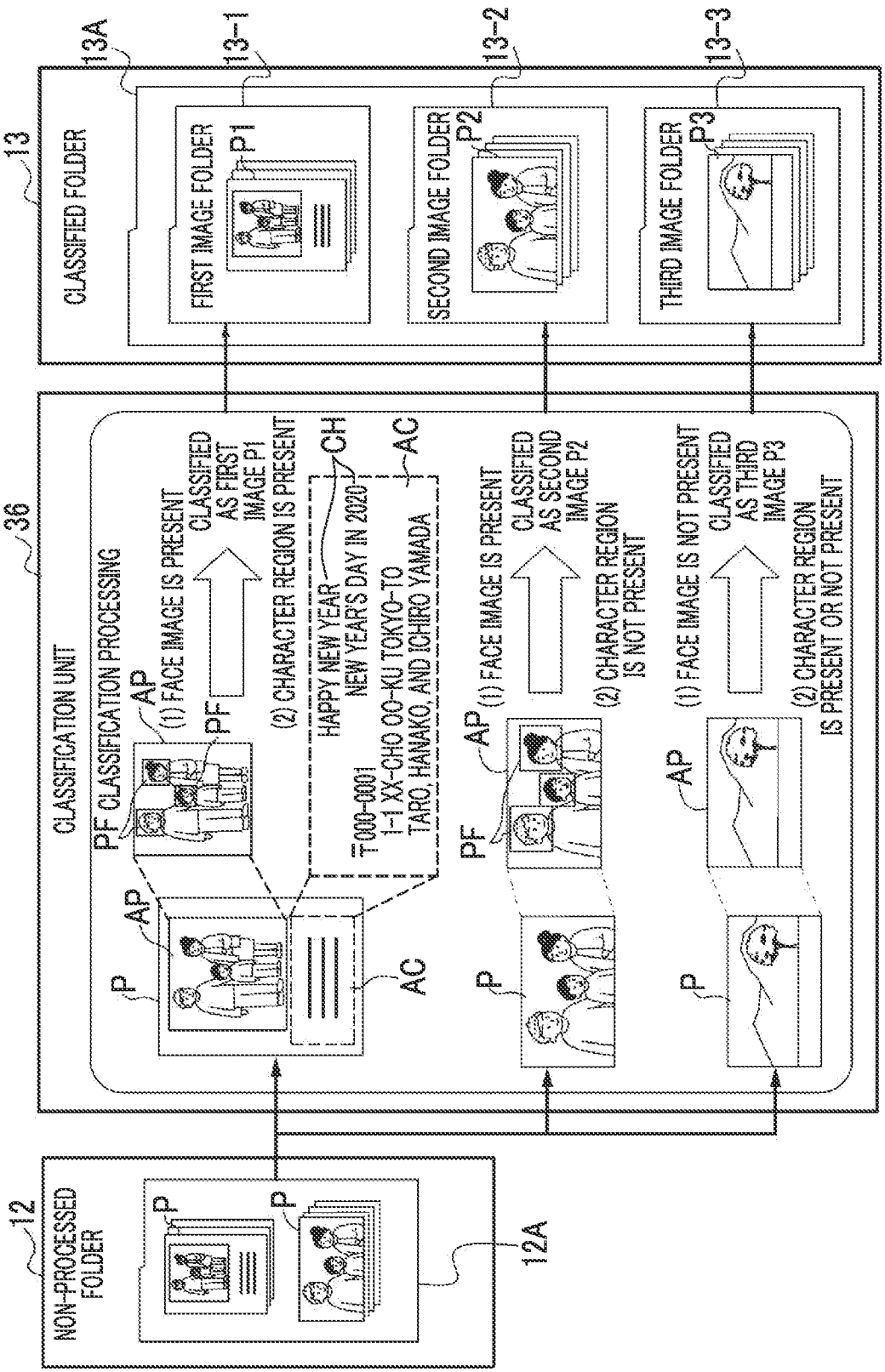
FIG. 4 is a description diagram of classification processing performed by a classification unit.

In FIG. 3, while the classification into two types of the first image P1 and the second image P2 is described, the classification unit 36, more specifically, classifies the image P into three types of the first image P1, the second image P2, and a third image P3 depending on whether or not the face image PF is present and whether or not the character region AC is present as illustrated in FIG. 4. Specifically, first, the image P that includes the photo region AP and the character region AC and in which the photo region AP includes the face image PF is classified as the first image P1. The image P that includes the photo region AP and does not include the character region AC and in which the photo region AP includes the face image PF is classified as the second image P2. In addition, the image P that includes the photo region AP and does not include the character region AC and in which the photo region AP does not include the face image PF is classified as the third image P3. In the example in FIG. 4, while the third image P3 is illustratively described as not including the character region AC, the third image P3 requires the photo region AP not including the face image PF and thus, may include or not include the character region AC.

A classified folder 13 that stores each of the classified first image P1, second image P2, and third image P3 is provided in the storage 4. In the classified folder 13, a first image folder 13-1 that stores the first image P1, a second image folder 13-2 that stores the second image P2, and a third image folder 13-3 that stores the third image P3 are provided for each user. In the example in FIG. 4, three of the first image folder 13-1, the second image folder 13-2, and the third image folder 13-3 are dedicated folders of the user A.

Next, an example of the first recognition processing and the first acquisition processing performed on the first image will be described with reference to FIG. 5 to FIG. 7.

Figure 5:
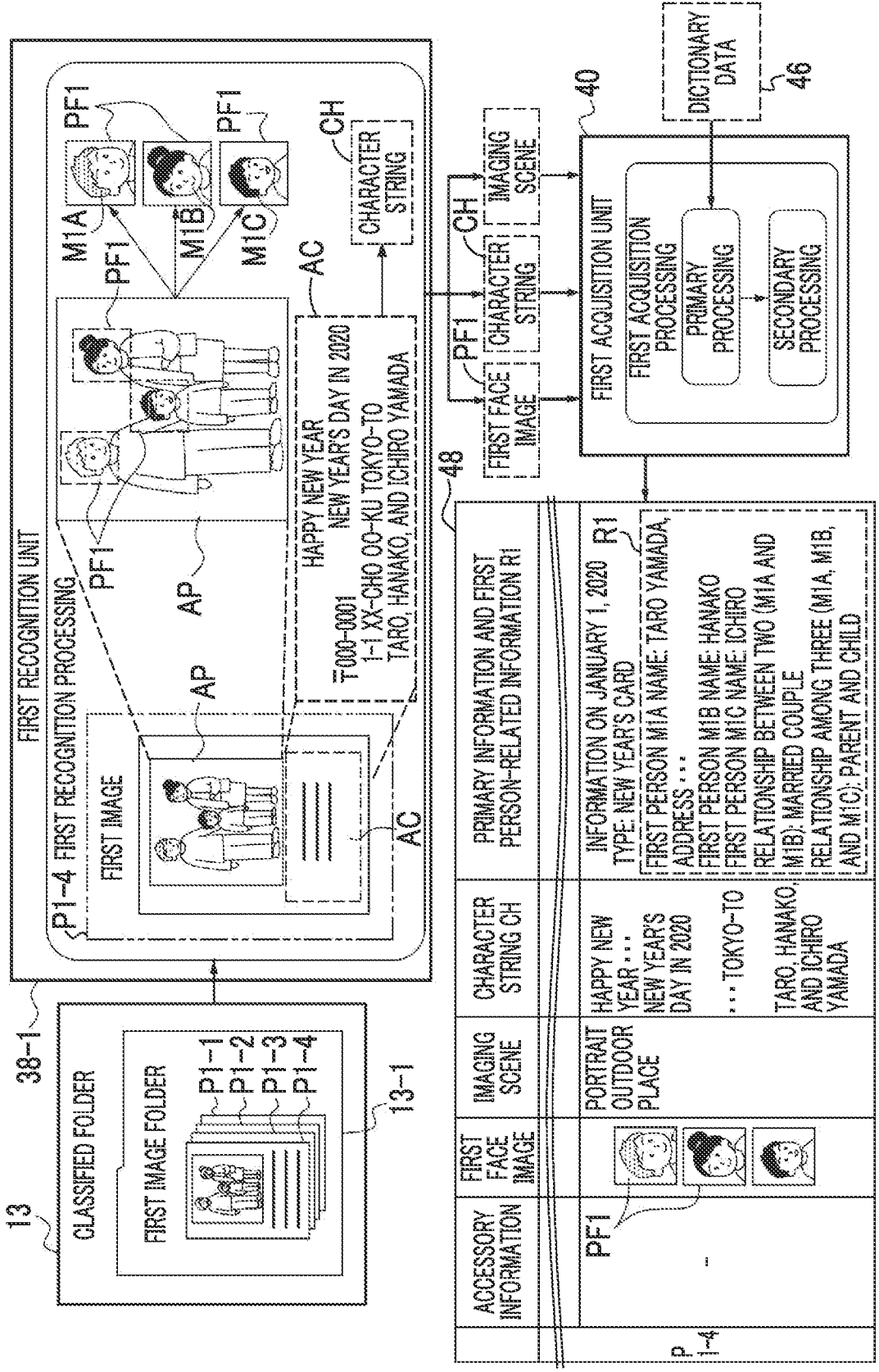
FIG. 5 is a description diagram of first recognition processing performed by a first recognition unit and first acquisition processing performed by a first acquisition unit.

As illustrated in FIG. 5, the first recognition unit 38-1 executes the first recognition processing by sequentially reading out the first image P1 one by one from the first image folder 13-1 of the classified folder 13. In the following example, in a case of distinguishing a plurality of first images P1 from each other, the plurality of first images P1 will be illustrated by attaching sub-reference numerals "-1", "-2", and "-3" to reference numeral P1, such as a first image P1-1 and a first image P1-2. In FIG. 5, an example of performing the first recognition processing on a first image P1-4 is illustrated. The first recognition processing includes first face recognition processing, character recognition processing, and imaging scene determination processing.

In the first face recognition processing, the first recognition unit 38-1 recognizes a face of a first person M1 included in the photo region AP of the first image P1-4. As face recognition technology, the same technology as the face recognition technology used in the classification unit 36 is used. For example, the first recognition unit 38-1 extracts a rectangular region including the face recognized in the photo region AP as a first face image PF1. In a case where faces of a plurality of first persons M1 are included in the photo region AP as in the first image P1-4, faces of all first persons M1 are recognized, and the first face image PF1 is extracted for all recognized faces. In the example in FIG. 5, three first persons M1 are included in the photo region AP. Thus, three first face images PF1 are extracted. In addition, in a case where it is necessary to distinguish a plurality of first persons M1 from each other, the plurality of first persons M1 will be illustrated by attaching sub-reference numerals A, B, and C to reference numeral M1, such as a first person M1A, a first person M1B, and a first person M1C.

In the photo region AP, a face of a person who is unlikely to be considered to be a main subject may be captured in a background of the first person M1 as the main subject. As a solution for this case, for example, a small face may be determined as not the main subject and may be excluded from an extraction target in a case where a relatively small face is included in the photo region AP. In addition, for example, in a case where a size of a region of the first face image PF1 included in the photo region AP is less than or equal to a predetermined area, the first face image PF1 may be excluded.

In the character recognition processing, the first recognition unit 38-1 recognizes a character string CH from the character region AC included in the first image P1-4. The character string CH is composed of a plurality of characters and is an example of a character. In the character recognition processing, the character string CH recognized in the character region AC is converted into text data using character recognition technology.

In the imaging scene determination processing, the first recognition unit 38-1 determines an imaging scene of a photo shown in the photo region AP of the first image P1-4. Examples of the imaging scene include a portrait and scenery. The scenery includes a mountain, a sea, a city, a night view, an indoor place, an outdoor place, a festival, a ceremony, a sports game, and the like. For example, the imaging scene is determined by image analysis using pattern matching and machine learning. In the example in FIG. 5, the imaging scene of the first image P1-4 is determined as "portrait" and "outdoor place". A plurality of determination results of the imaging scene may be obtained.

As an example, the first acquisition unit 40 executes the first acquisition processing based on the first face image PF1 representing the face of the first person M1, the character string CH, and the imaging scene. The first acquisition processing includes primary processing and secondary processing.

The primary processing is processing of determining a meaning of the character string CH using dictionary data 46 and acquiring the determined meaning as primary information. The primary information is used as base information that is a base of various determinations in the secondary processing. The secondary processing is processing of acquiring the first person-related information R1 based on the acquired primary information, the first face image PF1, and the like.

Results of the first recognition processing and the first acquisition processing are recorded in the first image information list 48. The first image information list 48 is a file in which first image information including the first face image PF1 acquired for each first image P1, the primary information acquired based on the character string CH, the imaging scene, and the first person-related information R1 in the first acquisition processing is recorded. The first image information includes not only the information acquired in the first acquisition processing but also the accessory information in a case where the accessory information such as the EXIF information attached to the first image P1 is present. In addition, the first image information includes the character string CH recognized by the first recognition processing. The accessory information and the character string CH are also recorded in the first image information list 48. In the first image information list 48, image information of the plurality of first images P1 are listed by recording image information of each of the plurality of first images P1.

A specific example of the primary processing and the secondary processing of the first acquisition processing will be described with reference to FIG. 6. As illustrated in FIG. 6, in the primary processing, the first acquisition unit 40 determines the meaning of the character string CH by referring to the dictionary data 46. The dictionary data 46 stores data in which a plurality of patterns of a character string are associated with a meaning of the character string. For example, a plurality of types of typical patterns of a character string representing "New Year's greeting" are registered in the dictionary data 46. In a case where the character string CH coincides with a pattern of "New Year's greeting", the meaning of the character string CH is determined as "New Year's greeting". In addition, a plurality of types of typical patterns of a character string representing "name", "address" and the like are registered in the dictionary data 46. In a case where the character string CH coincides with a pattern of "name" and "address", the meaning of the character string CH is determined as "name" and "address". Examples of the meaning of the character string CH include not only a name and an address but also a telephone number, nationality, a workplace, a school name, an age, a date of birth, and interest. Typical patterns of these character strings are also registered in the dictionary data 46, and various meanings of the character string CH can be determined. While the dictionary data 46 is recorded in the memory 22, the disclosed technology is not limited thereto, and the dictionary data 46 may be recorded in the storage 4.

Figure 6:
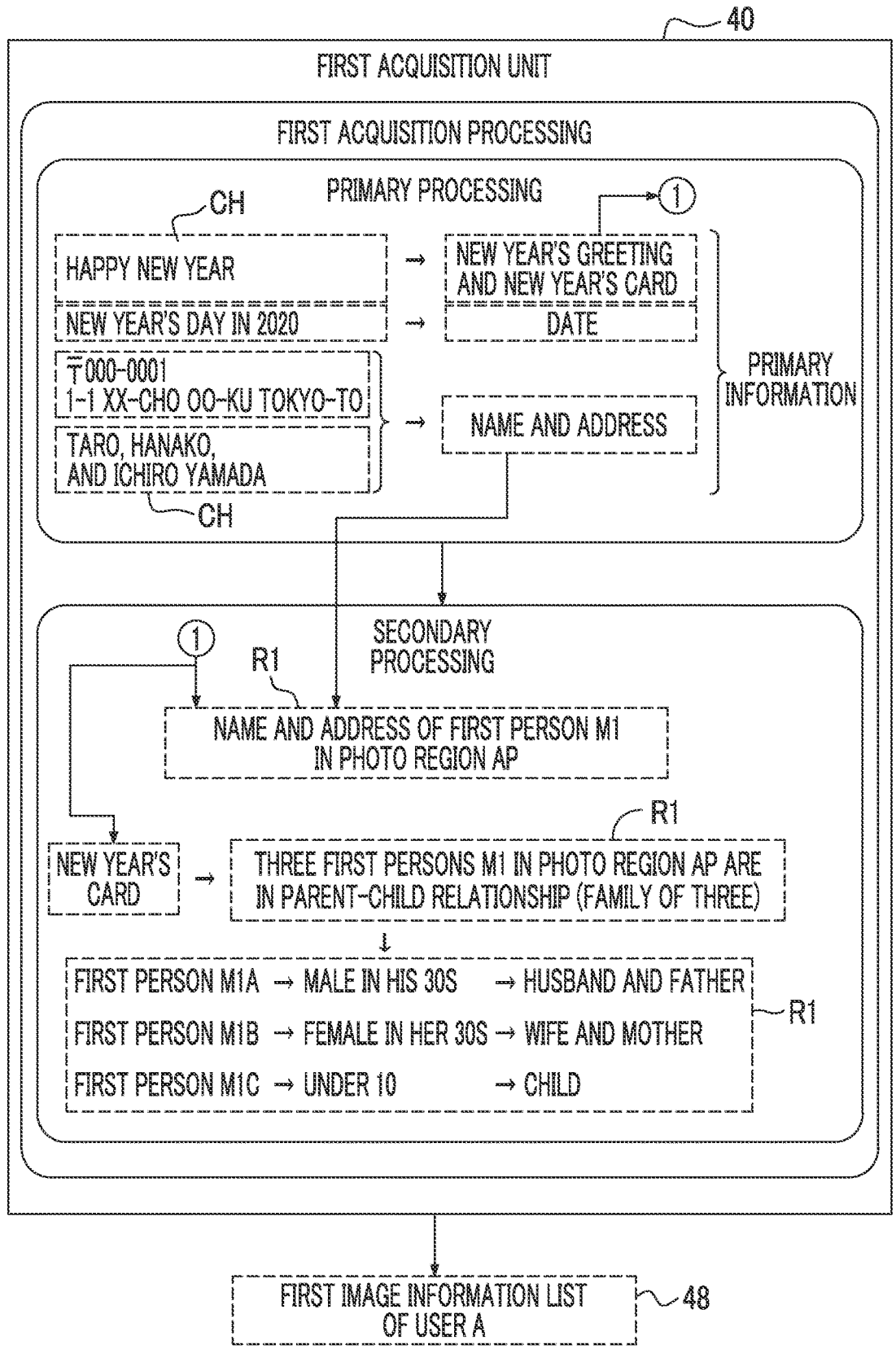
FIG. 6 is a description diagram illustrating an example of the first acquisition processing.

In the example in FIG. 6, the character string CH of "Happy New Year" is determined as "New Year's greeting". The character string CH of "New Year's Day in 2020" is determined as "date". The character string CH of "1-1 XX-cho OO-ku Tokyo-to" is determined as "address". The character string CH of "Taro, Hanako, and Ichiro Yamada" is determined as "name".

In addition, in the primary processing, for example, a type of the content of the first image P1 is estimated based on the determined meaning of the character string CH. For example, the type of the content of the first image P1 is information as to whether the first image P1 shows a New Year's card or a Christmas card. In the primary processing, the determined meaning of the character string CH such as "New Year's greeting", "date", "name", and "address" and the type (in the present example, a New Year's card) of the content of the first image P1 estimated based on the meaning of the character string CH are acquired as the primary information. The primary information is information acquired from only the character string CH, and the meaning of the character string CH determined by the primary processing is also a general meaning.

In the secondary processing, the first acquisition unit 40 acquires the first person-related information R1 related to the first person included in the first image P1 using the primary information as the base information. In the present example, the first image P1-4 is a New Year's card, and the primary information includes the type of the content of the first image P1-4 as a New Year's card. In a case of a New Year's card, "name" and "address" included in the character region AC are generally "address" and "name" of the first person M1 included in the photo region AP. Since "New Year's card" is included in the primary information of the first image P1-4, the first acquisition unit 40 estimates "address" and "name" included in the primary information as "name" and "address" of the first person M1 in the photo region AP.

That is, at a time of the primary processing, the meaning of the character string CH of "address" and "name" is only recognized as a general meaning not connected to a specific person. However, in the secondary processing, the meaning of the character string CH changes to a specific meaning decided in a relationship with the first person M1 such that the character string CH means "address" and "name" of the first person M1 detected by recognizing the face from the first image P1. Information indicating that "name" and "address" included in the first image P1 is "name" and "address" of the first person M1 included in the photo region AP included in the first image P1 is information acquired based on the characters recognized from the first image P1 and the face of the first person M1 and is an example of the first person-related information R1.

In addition, in a case of a New Year's card, in a case where faces of the plurality of first persons M1 are included in the photo region AP, a relationship among the plurality of first persons M1 is generally a family relationship of a married couple, a parent and a child, or the like. Thus, since "New Year's card" is included in the primary information of the first image P1-4, the first acquisition unit 40 estimates that the plurality of first persons M1 in the photo region AP are in a family relationship. Since three first persons M1 are included in the first image P1-4, a relationship among the three first persons M1 is estimated as a family of three. Information indicating that the relationship among the three first persons M1 is a parent-child relationship and a family of three is information acquired based on the characters recognized from the first image P1 and the faces of the first persons M1 and is an example of the first person-related information R1.

Furthermore, as an example, the first acquisition unit 40 estimates sexes and ages of the three first persons M1A, M1B, and M1C by analyzing the first face image PF1 of each of the three first persons M1A, M1B, and M1C included in the first image P1-4. In the present example, it is estimated that the first person M1A is a male in his $30s$, the first person M1B is a female in her $30s$, and the first person M1C is a child under 10. Based on this estimation result and information indicating a family of three, the first acquisition unit 40 acquires the first person-related information R1 indicating that the first person M1A is "husband" and "father", the first person M1B is "wife" and "mother", and the first person M1C is a child of the first person M1A and the first person M1B.

The first acquisition unit 40 acquires the first person-related information R1 related to the first person M1 based on the characters recognized from the first image P1 and the face of the first person M1. In a case where the plurality of first images P1 are present, the first acquisition unit 40 acquires the primary information and the first person-related information R1 by performing the first recognition processing and the first acquisition processing for each first image P1. The acquired first person-related information R1 is recorded in the first image information list 48. While the first image information list 48 is recorded in the memory 22, the disclosed technology is not limited thereto, and the first image information list 48 may be recorded in the storage 4.

In the first image information list 48 illustrated in FIG. 7 as an example, the first image information that is acquired from the plurality of first images P1 owned by the user A and includes the first face image PF1, the imaging scene, the character string CH, the primary information, and the first person-related information R1 is stored in association with each of the first images P1-1, P1-2, P1-3, . . . . For example, the first image information list 48 is stored in a storage region allocated to each user in the storage 4 together with the image P of each user.

In the first image information list 48 illustrated in FIG. 7, while the EXIF information is recorded in the first image P1-2 and the first image P1-3 as the accessory information, the EXIF information is not recorded in the first images P1-1 and P1-4. For example, this indicates that the first image P1-2 and the first image P1-3 are images captured by the smart device 6, the digital camera 8, or the like having a function of attaching the EXIF information at a time of imaging. On the other hand, it is indicated that the first images P1-1 and P1-4 in which the EXIF information is not recorded are images digitized by reading the printed photo PA by the scanner 10 or the like.

In addition, in the first image P1-1, information indicating that a pet of the first person M1 is a dog is included as the first person-related information R1. For example, this information is obtained by estimating the dog as the pet of the first person M1 in a case where the dog is captured in the first image P1-1 together with the first person M1.

In addition, the first image P1-1 to the first image P1-4 illustrated in FIG. 7 are an example of a New Year's card of which a sender is "Taro Yamada". For example, an example in which the user A of "Taro Yamada" stores the first image P1 of a New Year's card of which a sender is the user A in the storage 4 is illustrated.

The first image P1-1 to the first image P1-4 are arranged in chronological order of sent years. The date of the first image P1-1 is in "2010" and is the oldest, and the date of the first image P1-4 is in "2020" and is the newest. In the first acquisition processing, since the name "Taro Yamada" is included in common in the first image P1-1 to the first image P1-4, it can also be estimated that the name of the first person M1A included in common in the first image P1-1 to the first image P1-4 is "Taro Yamada". In addition, in the first image information list 48, since the first face image PF1 of the first person M1A and the date included in each of the first image P1-1 to the first image P1-4 are recorded, a change in the face of the first person M1A can be traced. Such a change in the face of the first person M1A for each year is also included in the first person-related information R1. In other words, the first person-related information R1 also includes information acquired from the plurality of first images P1.

The first image information including the first person-related information R1 recorded in the first image information list 48 is not only used as the tag information of the first image P1 but also is used for determining the image content as a premise of the tagging of the second image P2.

Next, the second recognition processing, the second acquisition processing, and the tagging processing performed on the second image P2 will be described with reference to FIG. 8 to FIG. 11.

Figure 8:
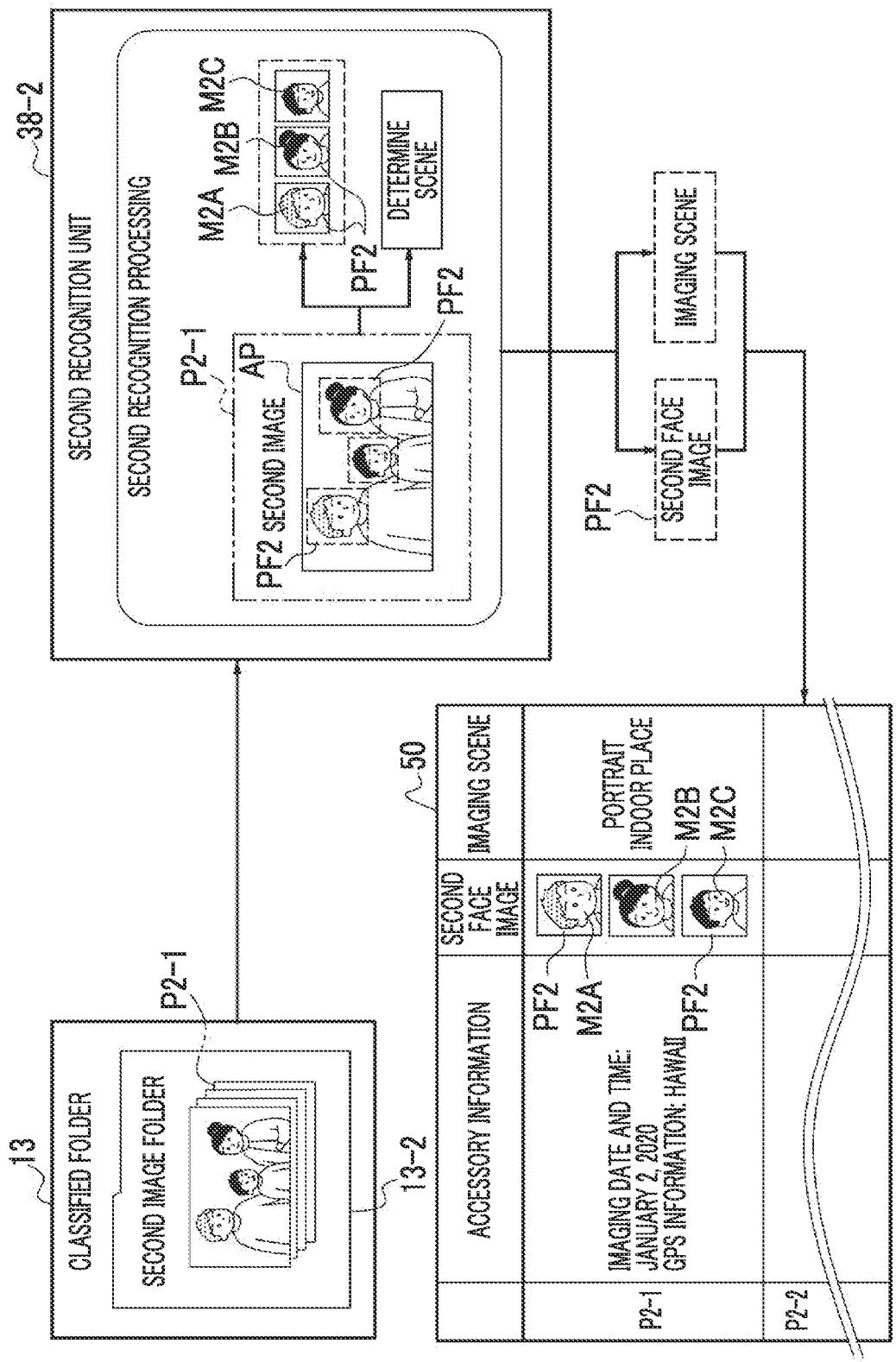
FIG. 8 is a description diagram of second recognition processing performed by a second recognition unit.

As illustrated in FIG. 8 as an example, the second recognition unit 38-2 executes the second recognition processing by sequentially reading out the second image P2 one by one from the second image folder 13-2 of the classified folder 13. In the following example, in a case of distinguishing a plurality of second images P2 from each other, the plurality of second images P2 will be illustrated by attaching sub-reference numerals to reference numeral P2, such as a second image P2-1 and a second image P2-2, in the same manner as the first image P1. In FIG. 8, an example of performing the second recognition processing on the second image P2-1 is illustrated. The second recognition processing includes second face recognition processing and the imaging scene determination processing.

In the second face recognition processing, the second recognition unit 38-2 recognizes a face of a second person M2 included in the photo region AP of the second image P2-1 using the same face recognition technology as the first recognition unit 38-1. For example, the second recognition unit 38-2 extracts a rectangular region including the face recognized in the photo region AP as a second face image PF2. In a case where a plurality of second persons M2 are included in the photo region AP as in the second image P2-1, faces of all second persons M2 are recognized, and the second face image PF2 is extracted for all recognized faces. In the example in FIG. 8, faces of three second persons M2 are included in the photo region AP of the second image P2-1. Thus, three second face images PF2 are extracted. In addition, even for the second person M2, in a case where it is necessary to distinguish a plurality of second persons M2 from each other, the plurality of second persons M2 will be illustrated by attaching sub-reference numerals A, B, and C to reference numeral M2, such as a second person M2A, a second person M2B, and a second person M2C, in the same manner as the first person M1. Processing of determining a small face as not the main subject and excluding the small face from the extraction target in a case where a relatively small face is included in the photo region AP as a background is also the same as in the first recognition processing.

In the imaging scene determination processing, the second recognition unit 38-2 determines an imaging scene of a photo shown in the photo region AP of the second image P2-1. A method of determining the imaging scene is also the same as the method for the first image P1. In the example in FIG. 8, the imaging scene is determined as "portrait" and "indoor place". A result of the second recognition processing is recorded in the second image information list 50. While the second image information list 50 is recorded in the memory 22, the disclosed technology is not limited thereto, and the second image information list 50 may be recorded in the storage 4.

Figure 9:
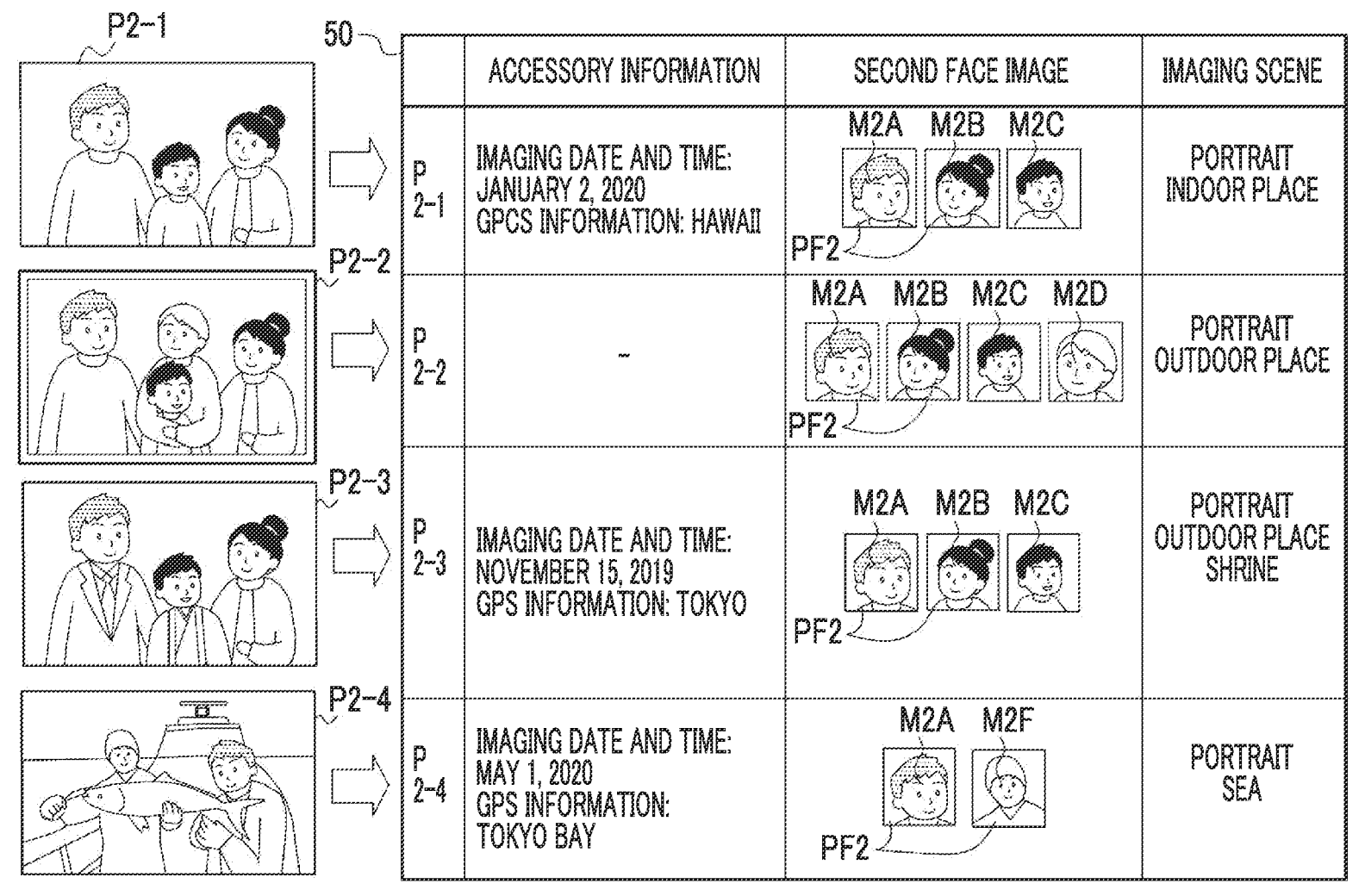

As illustrated in FIG. 9 as an example, the second image information list 50 is a file in which second image information including the second face image PF2 representing the face of the second person M2 recognized from the second image P2 and the imaging scene is recorded in the second recognition processing. Since the second image P2-1 and a second image P2-3 include faces of three second persons M2, three second face images PF2 are recorded as the second image information. Since the second image P2-2 includes faces of four second persons M2, four second face images PF2 are recorded as the second image information. Since a second image P2-4 includes faces of two second persons M2, two second face images PF2 are recorded as the second image information.

In addition, in the second image information list 50, "shrine" is recorded as an imaging scene of the second image P2-3 in addition to "portrait" and "outdoor place". For example, this content is determined based on inclusion of a shrine house, a shrine gate, or the like in a background of the photo region AP of the second image P2-3. In addition, "sea" is recorded as an imaging scene of the second image P2-4 in addition to "portrait". This content is determined based on inclusion of a sea and a ship in a background of the photo region AP of the second image P2-4.

In addition, the second image information list 50 includes not only the information recognized in the second recognition processing but also the accessory information in a case where the accessory information such as the EXIF information attached to the second image P2 is present. Image information of each of the plurality of second images P2 is recorded in the second image information list 50. In the second image information list 50, while the EXIF information is recorded in the second image P2-1, the second image P2-3, and the second image P2-4 among the second images P2-1 to P2-4, the EXIF information is not recorded in the second image P2-2.

The accessory information includes the GPS information. Information indicating that the imaging location is Hawaii is recorded as the GPS information of the second image P2-1. Information indicating that the imaging location is Tokyo is recorded as the GPS information of the second image P2-3.

In addition, information indicating that the imaging location is Tokyo Bay is recorded as the GPS information of the second image P2-4.

Figure 10:
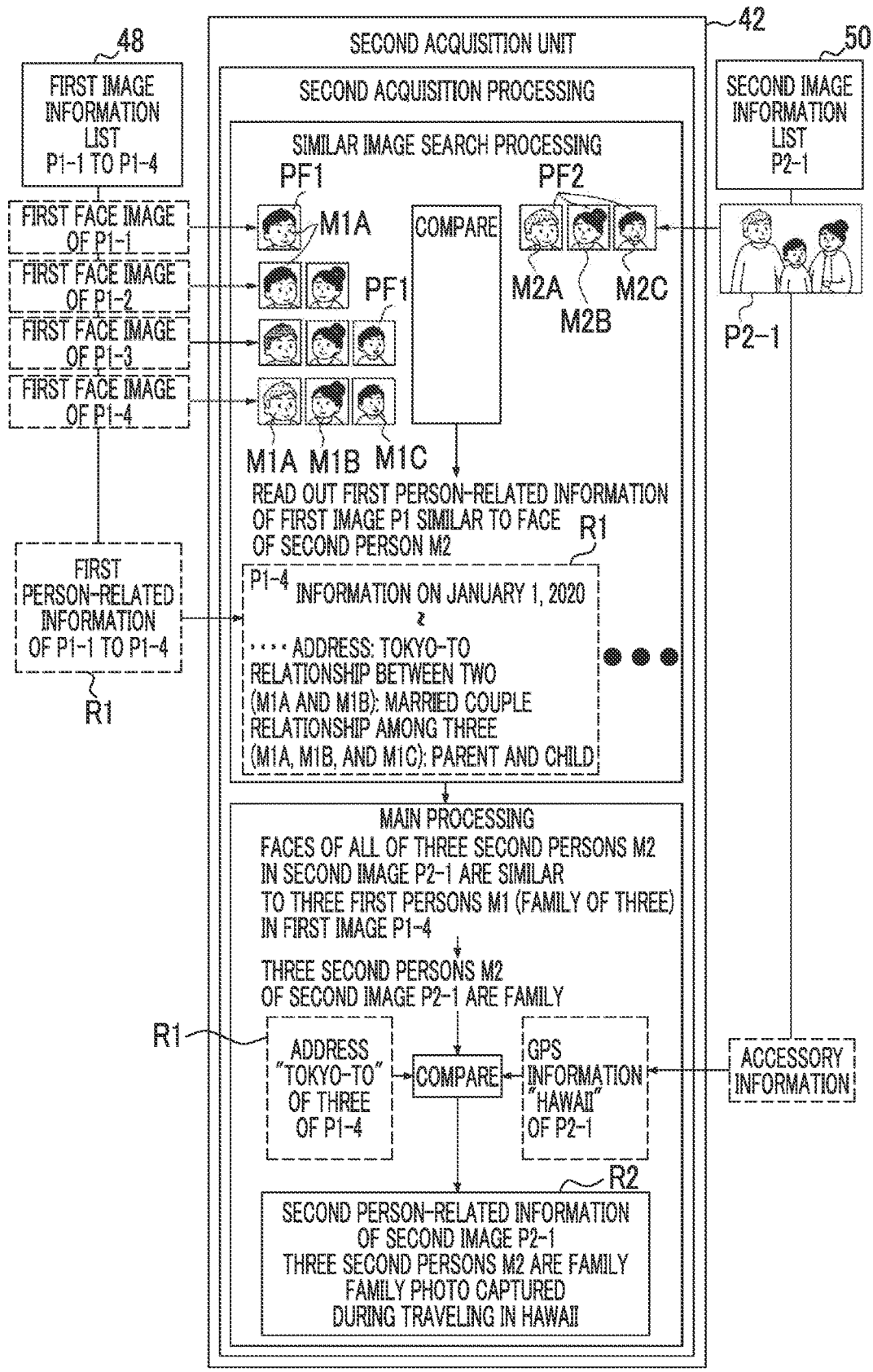
FIG. 10 is a description diagram of second acquisition processing performed by a second acquisition unit.

As illustrated in FIG. 10 as an example, the second acquisition unit 42 executes the second acquisition processing of acquiring the second person-related information R2 related to the second person M2 included in the second image P2. The second acquisition processing includes similar image search processing and main processing. The example in FIG. 10 is an example of executing the second acquisition processing on the second image P2-1.

In the similar image search processing, the second acquisition unit 42 reads out the second face image PF2 of the processing target second image P2-1 from the second image information list 50. The second acquisition unit 42 compares the second face image PF2 with the first face image PF1 included in the first image P1 of the same user A. The first image P1 including the first face image PF1 similar to the second face image PF2 included in the second image P2-1 is searched for from the plurality of first images P1. In the example in FIG. 10, the first face image PF1 and the second face image PF2 to be compared are read out from the first image information list 48 and the second image information list 50, respectively.

The second acquisition unit 42 performs the comparison with the first face image PF1 for each second face image PF2 of each second person M2 included in the second image P2-1. Since the second image P2-1 includes three second persons M2 and includes the second face images PF2 of three persons, the second acquisition unit 42 compares each of the three second face images PF2 with the first face image PF1. Even in the first image P1, a plurality of first persons M1 may be included, and the first face images PF1 corresponding in number to the first persons M1 may be included. In this case, the comparison is performed for each first face image PF1.

In the present example, the second face images PF2 of three persons of the second image P2-1 are compared with the first face image PF1 of one person included in the first image P1-1. In this case, the number of combinations for comparison is 3×1=3. Next, the second face images PF2 of three persons of the second image P2-1 are compared with the first face images PF1 of two persons included in the first image P1-2. In this case, the number of combinations for comparison is 3×2=6. Next, the second face images PF2 of three persons of the second image P2-1 are compared with the first face images PF1 of three persons included in the first image P1-3. In this case, the number of combinations for comparison is 3×3=9. Next, the second face images PF2 of three persons of the second image P2-1 are compared with the first face images PF1 of three persons included in the first image P1-4. Since the first face images PF1 of three persons are included in the first image P1-4 as in the first image P1-3, the number of combinations for comparison in a case of the first image P1-4 is also 3×3=9. This comparison is performed for the number of first images P1. In the present embodiment, while a case of comparing images of persons included in the first image P1 with images of persons included in the second image P2 in a round-robin manner is disclosed, the disclosed technology is not limited thereto. For example, the second person M2A included in the second image P2 may be analyzed, and in a case where the first person M1A of the first image P1-4 is an image similar by a predetermined level or higher, the first person M1 (for example, the first person M1B and the first person M1C) other than the first person M1A included in the first image P1-4 may be preferentially compared.

By comparing a plurality of second face images PF2 included in the processing target second image P2 with a plurality of first face images PF1 included in the plurality of first images P1, the first image P1 including the face of the first person M1 similar to the face of the second person M2 is searched. For example, a determination as to whether or not faces are similar results in a determination that the faces are similar in a case where an evaluation value of a degree of similarity is greater than or equal to a preset threshold value. The evaluation value of the degree of similarity is calculated using image analysis technology such as pattern matching and machine learning based on a feature amount that represents a morphological feature of a face.

In the example in FIG. 10, four first images P1-1, P1-2, P1-3, and P1-4 are searched as the first image P1 including the face of the first person M1 similar to the faces of the three second persons M2 of the second image P2-1. In a case where the number of searched images is large, an image having a low evaluation value of the degree of similarity may be excluded by extracting a preset number of images in a descending order of the evaluation value of the degree of similarity.

The second acquisition unit 42 reads out the first image information including the first person-related information R1 corresponding to each of the searched first image P1-1 to first image P1-4 from the first image information list 48.

In the main processing, the second acquisition unit 42 acquires the second person-related information R2 using the image information including the first person-related information R1. First, the second acquisition unit 42 estimates that the three second persons M1 of the second image P2-1 are a family of three based on a fact that the faces of the three second persons M2A, M2B, and M2C in the second image P2-1 are similar to the first persons M1A, M1B, and M1C of the family of three in the first image P1-4, respectively. In addition, the GPS information included in the accessory information of the second image P2-1 is "Hawaii". That is, the imaging location of the second image P2-1 is "Hawaii". On the other hand, the address of the first person M1 included in the first person-related information R1 is "Tokyo-to". The second acquisition unit 42 estimates that the "second image P2-1 is a family photo captured during traveling in Hawaii" based on a result of comparison between the imaging location and the address. The second acquisition unit 42 acquires an estimation result indicating an estimation that the "three second persons M2 are a family" in the second image P2-1 and an estimation that the second image P2-1 is a "family photo captured during traveling in Hawaii" as the second person-related information R2 related to the second person M2.

For example, as in the first person-related information R1 acquired from the first image P1-4, the second person-related information R2 of the second image P2-1 may include, in addition to the information illustrated in FIG. 10, a sex and an age obtained by performing image analysis on an appearance including the face of the second person M2 included in the second image P2-1. As will be described later, validity of an estimation result of the sex, the age, and the like estimated by image analysis may be verified using the first person-related information R1.

Figure 12:
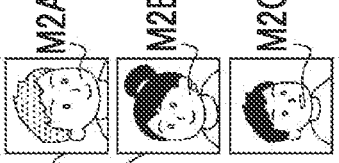
FIG. 12 is a table illustrating an example of the second image information list to which second person-related information and tag information are added.

The second person-related information R2 acquired by the second acquisition processing is recorded in the second image information list 50 (refer to FIG. 12). The second person-related information R2 is used in the tagging processing for the second image P2.

Figure 11:
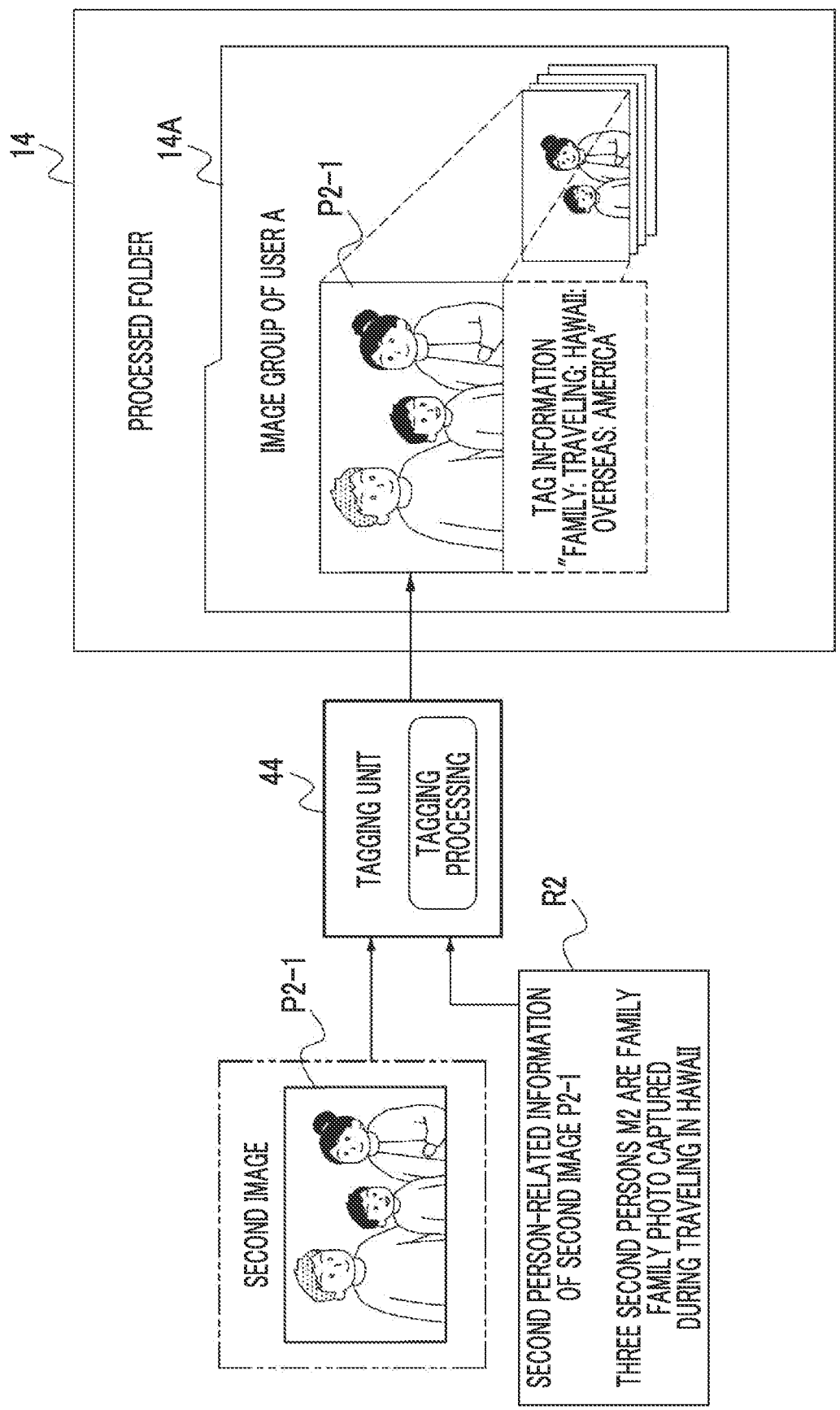
FIG. 11 is a description diagram of tagging processing performed by a tagging unit.

As illustrated in FIG. 11 as an example, the tagging unit 44 executes the tagging processing on the processing target second image P2-1 based on the second person-related information R2 acquired by the second acquisition unit 42. In the tagging processing, the tagging unit 44 extracts a keyword to be used in the tag information from the second person-related information R2. For example, in a case where the second person-related information R2 indicates that the "second image P2-1 is a family photo captured during traveling in Hawaii", the tagging unit 44 extracts "family", "traveling", and "Hawaii" from the second person-related information R2 as the keyword to be used in the tag information. The keyword to be used in the tag information may be simply a word included in the second person-related information R2 or may be a different word having a substantially common meaning. Examples of the different word having a substantially common meaning include "overseas" and "America" that geographically include "Hawaii". All of these three words can be included in a superordinate concept "overseas" considering Japan as a base point and thus, are said to have a substantially common meaning.

The tagging unit 44 assigns these keywords to the second image P2-1 as the tag information. The tagging unit 44 stores the second image P2-1 to which the tag information is assigned in the user A dedicated folder 14A provided in the processed folder 14.

As illustrated in FIG. 12 as an example, the second person-related information R2 acquired by the second acquisition unit 42 and the tag information assigned by the tagging unit 44 are recorded in the second image information list 50 in association with the second image P2-1. In the second image information list 50, the second person-related information R2, the tag information, and the like are recorded for each second image P2.

Next, an action of the above configuration will be described with reference to the flowchart in FIG. 13. The image content determination processing of the second image P2 in the image content determination device 2 is performed in the procedure illustrated in FIG. 13 as an example.

In the present example, the image content determination device 2 executes the image content determination processing for each image P of each user at a preset timing. For example, the preset timing is a timing at which the number of non-processed images P uploaded to the storage 4 from the user is monitored and the number of non-processed images P reaches a preset number. For example, in a case where the number of non-processed images P uploaded to the storage 4 by the user A reaches the preset number, the image content determination device 2 executes the image content determination processing on the image P of the user A. The preset timing may be a timing at which the image P of the user is newly uploaded. Hereinafter, a case of executing the image content determination processing on the image P of the user A will be illustratively described.

Figure 13:
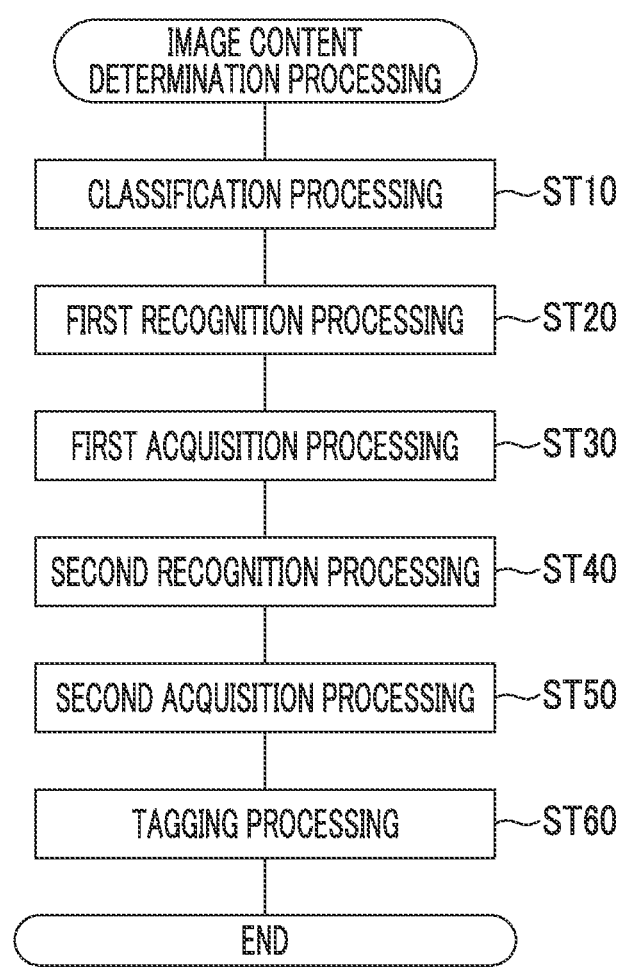
FIG. 13 is a flowchart of image content determination processing.

In the image content determination processing, first, the classification unit 36 executes the classification processing in step ST10 in FIG. 13. In the classification processing, as illustrated in FIG. 4 as an example, the classification unit 36 reads out the non-processed image P of the user A from the non-processed folder 12. The image P is classified as any of the first image P1, the second image P2, and the third image P3 based on whether or not the face image PF is present in the photo region AP and whether or not the character region AC is present in the image P. In a case where the image P includes the photo region AP and the character region AC, and the photo region AP includes the face image PF, the classification unit 36 classifies the image P as the first image P1. In addition, in a case where the image P includes the photo region AP including the face image PF and does not include the character region AC, the classification unit 36 classifies the image P as the second image P2. In addition, in a case where the image P includes the photo region AP not including the face image PF or does not include the photo region AP, the classification unit 36 classifies the image P as the third image P3.

For example, the classification unit 36 executes the classification processing on all of a plurality of non-processed images P of each user. Each of the classified first image P1, second image P2, and third image P3 is stored in the classified folder 13.

Next, the first recognition unit 38-1 executes the first recognition processing in step ST20 in FIG. 13. In the first recognition processing, as illustrated in FIG. 5 as an example, the first recognition unit 38-1 executes the first recognition processing on the first image P1 in the classified folder 13. In the first recognition processing, the first recognition unit 38-1 first performs the first face recognition processing of recognizing the face of the first person M1 included in the photo region AP of the first image P1. In a case of the first image P1-4 illustrated in FIG. 5 as an example, since faces of three first persons M1 are included in the photo region AP, the faces of the three first persons M1 are recognized from the first image P1-4. The first recognition unit 38-1 extracts the faces of the three first persons M1 recognized from the first image P1-4 as three first face images PF1.

Next, the first recognition unit 38-1 performs the character recognition processing on the first image P1. The first recognition unit 38-1 extracts the character string CH from the character region AC included in the first image P1. In a case of the first image P1-4 illustrated in FIG. 5, the character string CH of ". . . OO-ku Tokyo-to", "Taro Yamada", and the like is recognized.

Next, the first recognition unit 38-1 performs the imaging scene determination processing on the first image P1. In the imaging scene determination processing, the first recognition unit 38-1 determines the imaging scene such as "portrait" and "outdoor place".

Next, the first acquisition unit 40 executes the first acquisition processing in step ST30 in FIG. 13. In the first acquisition processing, as illustrated in FIG. 5 as an example, the first acquisition unit 40 executes the first acquisition processing based on the character string CH that is an example of the recognized character, and the first face image PF1 representing the face of the first person M1. The first acquisition processing includes the primary processing and the secondary processing.

In the primary processing, the first acquisition unit 40 determines a general meaning of the character string CH by referring to the dictionary data 46. For example, as illustrated in FIG. 6, a general meaning of the character string CH of ". . . OO-ku Tokyo-to" is determined as an address. In addition, a general meaning of the character string CH of "Taro Yamada" is determined as a name. In addition, the meaning of the character string CH of "Happy New Year" is determined as "New Year's greeting". Furthermore, in the primary processing, since "New Year's greeting" is included in the character string CH, the type of the content of the first image P1 is estimated as "New Year's card". This information is acquired as the primary information and is used as the base information of the secondary processing.

In the secondary processing, as illustrated in FIG. 6, the first acquisition unit 40 acquires the first person-related information R1 related to the first person M1 included in the first image P1 using the primary information as the base information. As illustrated in FIG. 6, since the primary information of the first image P1-4 includes "New Year's card", the first acquisition unit 40 estimates that "name" and "address" included in the primary information are "name" and "address" of the first person M1 in the photo region AP. In addition, since the first image P1-4 is "New Year's card", the first acquisition unit 40 estimates that the three first persons M1 in the photo region AP are a family of three.

The first acquisition unit 40 acquires the estimated information as the first person-related information R1. The first acquisition unit 40 records the primary information obtained in the primary processing and the first person-related information R1 obtained in the secondary processing in the first image information list 48. As illustrated in FIG. 7 as an example, not only the primary information and the first person-related information R1 but also the first image information including the accessory information and the first face image PF1 are recorded in the first image information list 48.

The classification processing in step ST10 to the first acquisition processing in step ST30 are executed on the non-processed first image P1. Accordingly, image information of the plurality of first images P1 is recorded in the first image information list 48.

Next, the second recognition unit 38-2 executes the second recognition processing in step ST40 in FIG. 13. In the second recognition processing, as illustrated in FIG. 8 as an example, the second recognition unit 38-2 executes the second recognition processing on the second image P2 in the classified folder 13. In the second recognition processing, the second recognition unit 38-2 first recognizes the face of the second person M2 included in the photo region AP of the second image P2. In a case of the second image P2-1 illustrated in FIG. 8 as an example, since faces of three second persons M2 are included in the photo region AP, the second recognition unit 38-2 recognizes the faces of the three second persons M2 in the second image P2-1 and extracts regions including the recognized faces as three second face images PF2. Next, the second recognition unit 38-2 performs the imaging scene determination processing of determining the imaging scene on the second image P2. In the example in FIG. 8, the imaging scene of the second image P2-1 is determined as "portrait" and "indoor place".

The second recognition unit 38-2 executes the second recognition processing on the processing target second image P2. As illustrated in FIG. 9 as an example, the second face image PF2 representing the face of the second person M2 recognized from the second image P2 and the imaging scene are recorded in the second image information list 50.

Next, the second acquisition unit 42 executes the second acquisition processing in step ST50. The second acquisition processing includes the similar image search processing and the main processing. As illustrated in FIG. 10 as an example, the second acquisition unit 42 first performs the similar image search processing of searching for the first image P1 including the first person M1 similar to the face of the second person M2 included in the second image P2-1 by comparing the second face image PF2 with the first face image PF1. In the example in FIG. 10, four first images P1 of the first image P1-1 to the first image P1-4 are searched by the similar image search processing as the first image P1 including the face of the first person M1 similar to any of the faces of the three second persons M2 included in the second image P2-1. The second acquisition unit 42 reads out the first image information including the first person-related information R1 corresponding to the searched first image P1 from the first image information list 48. As in the example in FIG. 10, in a case where a plurality of first images P1 are searched, the second acquisition unit 42 reads out the first image information including the first person-related information R1 corresponding to each of the searched plurality of first images P1 from the first image information list 48.

In the main processing, the second acquisition unit 42 acquires the second person-related information R2 based on the first image information including the first person-related information R1. In the example in FIG. 10, the first person-related information R1 includes information indicating that the three first persons M1 in the first image P1-4 are a family of three. Furthermore, all of the faces of the three second persons M2 of the second image P2-1 are similar to the faces of the three first persons M1 of the first image P1-4. Based on such information, the second acquisition unit 42 estimates that the three second persons M2 of the second image P2 are a family. Furthermore, while the GPS information of the second image P2-1 indicates that the imaging location is "Hawaii", the address of the family of three is recorded as "Tokyo-to" in the first person-related information R1 of the first image P1-4. By comparing this information, the second acquisition unit 42 estimates that the "second image P2-1 is a family photo captured during traveling in Hawaii". The second acquisition unit 42 records such an estimation result in the second image information list 50 (refer to FIG. 12).

The second acquisition unit 42 executes the tagging processing in step ST60 in FIG. 13. In the tagging processing, the second acquisition unit 42 assigns the tag information to the second image P2 based on the acquired second person-related information R2. In the example in FIG. 11, the tag information such as "family, traveling, Hawaii, . . . " is assigned to the second image P2-1 based on the second person-related information R2 acquired in the example in FIG. 10.

The second acquisition unit 42 executes the second recognition processing in step ST40 to the tagging processing in step ST60 in FIG. 13 on a plurality of non-processed second images P2. Consequently, the tag information is assigned to the plurality of second images P2 as illustrated in the second image information list 50 in FIG. 12 as an example. The tag information is used as a keyword for searching for the second image P2.

Figure 14:
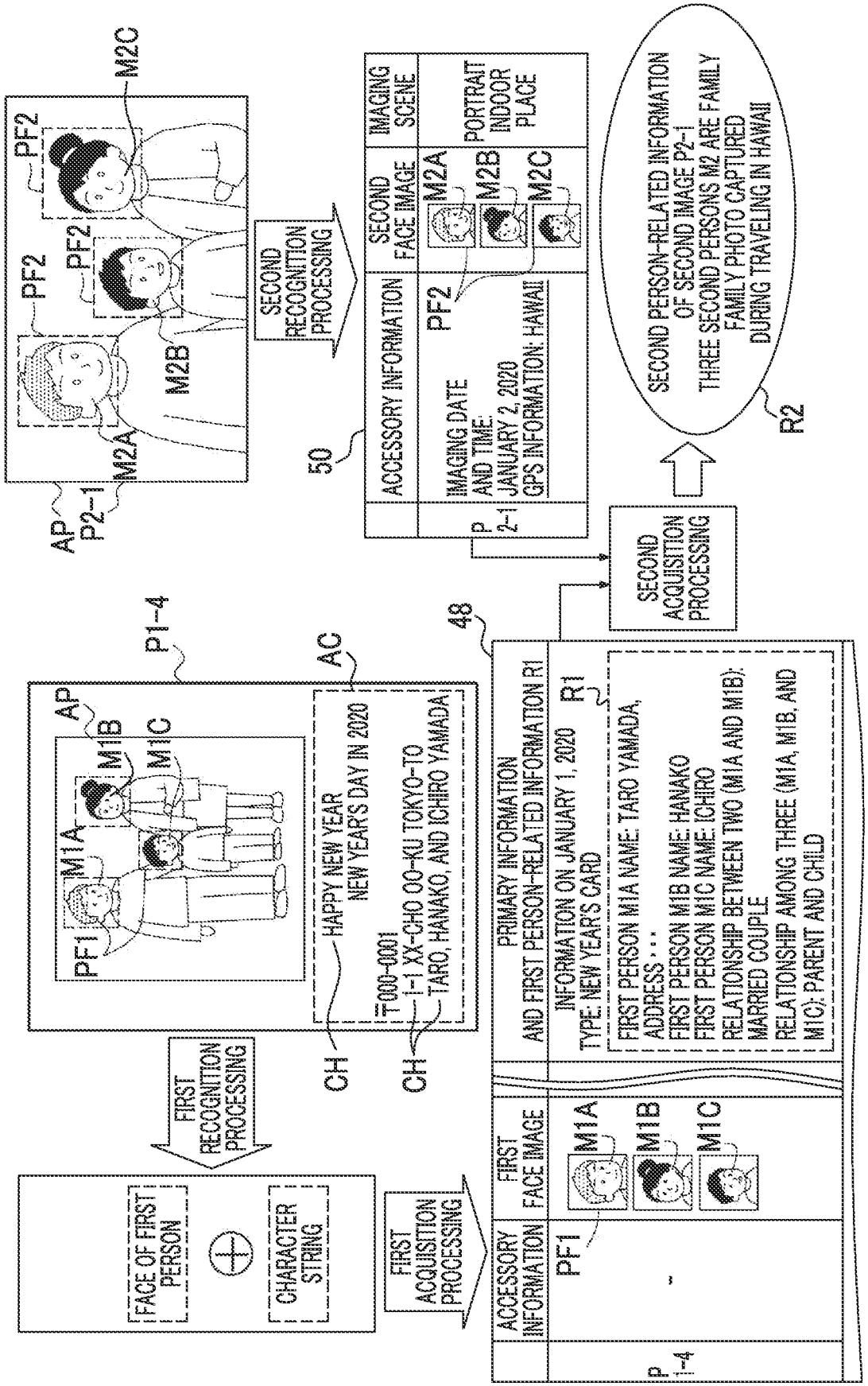
FIG. 14 is a schematic diagram illustrating a summary of a first embodiment.

A summary of the above is illustrated in FIG. 14. That is, in the image content determination device 2 of the present example, the first recognition unit 38-1 executes the first recognition processing of recognizing the character illustrated by the character string CH as an example and the face of the first person M1 from the first image P1 including the character and the face of the first person, such as a New Year's card like the first image P1-4. The first acquisition unit 40 executes the first acquisition processing of acquiring the first person-related information R1 related to the first person M1 included in the first image P1 based on the recognized character string CH and the face of the first person M1. In a case where the first image P1-4 is a New Year's card, "name" and "address" of the first person M1 are included as the first person-related information R1. Thus, "name" and "address" of the first person M1 and, furthermore, information indicating that the plurality of first persons M1 are a family are acquired.

The second recognition unit 38-2 executes the second recognition processing of recognizing the face of the second person M2 from the second image P2 including the face of the second person M2. In a case where the second image P2 is the second image P2-1, the faces of the three second persons M2 are recognized. The second acquisition unit 42 executes the second acquisition processing of acquiring the second person-related information R2 related to the second person M2 included in the second image P2-1. The second acquisition processing is processing of acquiring the second person-related information R2 using the first person-related information R1 corresponding to the first image P1 including the face of the first person M1 similar to the face of the second person M2. In the example in FIG. 14, in the second acquisition processing, the first person-related information R1 corresponding to the first image P1-4 including the three first persons M1 similar to the three second persons M2 included in the second image P2-1 is acquired. The second person-related information R2 indicating that the "three second persons M2 are a family" in the second image P2-1 and the second image P2-1 is a "family photo captured during traveling in Hawaii" is acquired using the first person-related information R1 indicating a family of three.

The character string CH included in the first image P1 such as a greeting card generally discloses accurate personal information of the first person M1 such as an address and a name and has high reliability as the base information for acquiring the first person-related information R1 related to the first person M1. Thus, the first person-related information R1 acquired using the character string CH included in the first image P1 is also information of high reliability. In determining the image content of the second image P2, the image content determination device 2 of the present example specifies the first image P1 related to the second image P2 based on similarity between the face of the second person M2 and the face of the first person M1 and acquires the first person-related information R1 corresponding to the specified first image P1. The first person-related information R1 of the first person M1 having a high possibility of being the same person as the second person M2 is used for acquiring the second person-related information R2 of the second person M2.

Thus, according to the image content determination device 2 of the present example, for example, the second person-related information R2 of high reliability can be acquired as information related to the person M2 included in the second image P2, compared to the related art in which the first person-related information R1 corresponding to the first image P1 is not used. In addition, in the image content determination device 2 of the present example, the CPU 18 executes the series of processing of acquiring the first person-related information R1 and the second person-related information R2. Thus, an effort of the user as in the related art is not required.

As an example, the second person-related information R2 is used as the tag information of the second image P2. The tag information is information generated from the second person-related information R2 and thus, has high reliability as information indicating the image content of the second image P2. Thus, a possibility that appropriate tag information representing the image content is assigned to the second image P2 is high. In a case of performing a keyword search for the second image P2, a possibility that the user can search for a desired second image P2 is also improved.

In the present example, the character region-including image including the photo region AP in which the face of the first person M1 is included, and the character region AC that is a blank outside the outline of the photo region AP and in which a character is arranged is illustrated as the first image P1. In addition, the character region non-including image of only the photo region AP in which the face of the second person M2 is included is illustrated as the second image P2.

It is relatively common to employ a format of the character region-including image in a greeting card, an identification document, and the like. In a case where the first image P is the character region-including image, a possibility that the character included in the character region AC means information related to the first person M1 included in the photo region AP is high. Thus, the first person-related information R1 related to the first person M1 acquired based on the character in the character region AC is also meaningful and has high reliability. By using such first person-related information R1, for example, information that is meaningful and has high reliability is likely to be acquired as the second person-related information R2, compared to a case where information acquired from an image consisting of only the photo region AP in which the face of the first person M1 is included is used as the first person-related information R1.

In addition, in a case where the second image P2 is the character region non-including image, an information amount is less than in a case where the second image P2 is the character region-including image. Thus, a clue in determining the image content is insufficient. Thus, an information amount of the second person-related information R2 that can be acquired from only the second image P2 of the character region non-including image is small. Thus, using the first person-related information R1 of the first image P1 of the character region-including image is particularly effective in a case of acquiring the second person-related information R2 from such a second image P2.

In addition, the first image P1 is an image representing at least one of a greeting card or an identification document. The greeting card includes not only a New Year's card, a Christmas card, and the like but also a seasonal greeting card and the like such as a summer greeting card. In addition, the greeting card includes not only a postcard announcing a birth of a child, events of the child such as Shichi-Go-San (an event for celebrating growth of 7-year-old girls, 5-year-old boys, and 3-year-old boys and girls), and notices of admission and graduation but also a notice of moving house and the like. The identification document includes a driver's license, a passport, an employee card, a student card, and the like. For example, such information disclosed in the greeting card and the identification document has particularly high accuracy and thus, is particularly effective as the first image P1 for acquiring the first person-related information R1 of high reliability, compared to a case where the first image P1 includes only an image representing a commercially available picture postcard. In addition, since there is a possibility of the greeting card including various information about a person such as words about a hobby, for example, a possibility that various information can be acquired as the first person-related information R1 is high, compared to a case where the first image P1 is an image representing a direct mail In the image content determination device 2 of the present example, the classification unit 36 executes the classification processing of classifying the plurality of images P into the first image P1 and the second image P2 before the first recognition processing and the second recognition processing are executed. By classifying the plurality of images P in advance into the first image P1 and the second image P2, processing of acquiring the first person-related information R1 and the second person-related information R2 can be efficiently performed, compared to a case where the classification processing is not performed in advance before each recognition processing.

In the present example, the first person-related information R1 is acquired from the first image P1 of the same owner as the second image P2. The same owner refers to a case where both of the first image P1 and the second image P2 are stored in the storage region of the account of the same user in the storage 4. In a case where the owner of the first image P1 is the same as the owner of the second image P2, commonality between the first person M1 included in the first image P1 and the second person M2 included in the second image P2 is high, compared to a case where the owner of the first image P1 is different from the owner of the second image P2. In acquiring the second person-related information R2 from the second image P2, the first person-related information R1 that is meaningful and is highly related to the second person M2 can be used. Thus, the reliability of the acquired second person-related information R2 is improved, compared to a case where the owner of the first image P1 is different from the owner of the second image P2. In addition, being likely to obtain the meaningful first person-related information R1 means small noise in other words. Thus, in a case where the owner of the first image P1 is the same as the owner of the second image P2, processing efficiency for acquiring the second person-related information R2 of high reliability is also improved, compared to a case where the owners are different.

The first person-related information R1 corresponding to the first image P1 owned by a person different from the owner of the second image P2 may also be used. The reason is as follows. For example, both owners may be in a relationship such that the owner of the first image P1 is a family, a friend, or a participant of the same event with the owner of the second image P2. In this case, using the first person-related information R1 corresponding to the first image P1 of a different owner in a case of acquiring the second person-related information R2 of the second image P2 results in a possibility of obtaining meaningful information. A user who can use the first person-related information R1 based on the image group of the user A may be limited to a user who satisfies a predetermined condition. For example, the predetermined condition may be designated by the user A or may be such that the user has a predetermined number or ratio or more of images similar to the images included in the image group of the user A.

In the present example, for example, the first person-related information R1 includes at least one of a name, an address, a telephone number, an age, a date of birth, or a hobby of the first person M1. The first person-related information R1 including this information is effective as a clue for acquiring the second person-related information R2. For example, the name of the first person M1 has a high value of use for specifying a name of the second person M2, and the telephone number of the first person M1 has a high value of use for specifying an address of the second person M2. In addition, the address may not be an accurate address and may have only a postal code or only a prefecture name In addition, the first person-related information R1 may include any of a nationality, an organization name to which a person belongs, and the like other than the above. The organization name to which a person belongs includes a workplace, a school name, a circle name, and the like. This information is also effective as a clue for acquiring the first person-related information R1 and the second person-related information R2.

In the present example, the first person-related information R1 and the second person-related information R2 include a family relationship. The family relationship is an example of information indicating a relationship of the plurality of first persons M1 included in the first image P1 or information indicating a relationship of the plurality of second persons M2 included in the second image P2. In a case where a plurality of first persons M1 are included in the first image P1, or in a case where a plurality of second persons M2 are included in the second image P2, the first person-related information R1 or the second person-related information R2 may include information indicating a relationship among the plurality of persons. As illustrated in the above example, the information indicating the relationship among the plurality of first persons M1 is effective for estimating the relationship among the plurality of second persons M2 identified as the first person M1. In addition, including the information indicating the relationship among the plurality of second persons M2 in the second person-related information R2 enables various tag information to be assigned, compared to a case where the second person-related information R2 is only information related to each of the plurality of second persons M2.

The information indicating the relationship among the plurality of first persons M1 or the information indicating the relationship among the plurality of second persons M2 may include not only a family relationship such as a married couple, a parent and a child, and siblings but also at least one of a relative relationship including a grandfather and a grandmother, a friend relationship, or a teacher-student relationship. In addition, the "relationship among the plurality of first persons M1" is not limited to a family relationship and a relative relationship and may be a human relationship such as a friend relationship or a teacher-student relationship. Thus, according to the present configuration, the first person-related information R1 or the second person-related information R2 of high reliability can be acquired, compared to a case where the information indicating the relationship among the plurality of first persons M1 or the information indicating the relationship among the plurality of second persons M2 is information indicating only a family relationship.

According to the present example, the second acquisition unit 42 uses the GPS information of the EXIF information that is an example of the accessory information attached to the second image P2. The accessory information such as the EXIF information of the second image P2 includes a large amount of useful information such the GPS information in terms of acquiring the second person-related information R2. By using the accessory information, the second person-related information R2 having higher reliability can be acquired, compared to a case of not using the accessory information. In the present example, while an example in which the second acquisition unit 42 uses the accessory information attached to the second image P2 in the second acquisition processing of acquiring the second person-related information R2 is illustratively described, the first acquisition unit 40 may also use the accessory information attached to the first image P1 in the first acquisition processing of acquiring the first person-related information R1.

In the above example, an example in which the second person-related information R2 of a "family photo captured during traveling in Hawaii" is acquired from the second image P2-1 of a family photo based on the first person-related information R1 acquired from the first image P1-4 of a New Year's card is described. Besides the above example, various first images P1 and second images P2 are present, and various aspects are considered for an aspect of what kind of first person-related information R1 is acquired from what kind of first image P1. In addition, various aspects are considered for what kind of second person-related information R2 is acquired from what kind of second image P2 based on what kind of first person-related information R1. Such various aspects will be illustrated in each embodiment below.

In each embodiment below, the image content determination device 2 has the same configuration as the first embodiment, and a basic processing procedure until acquiring the second person-related information R2 is also the same as the processing procedure illustrated in FIG. 13. The only difference is a content of information such as a type of at least one of the first image P1 or the second image P2 and contents of the first person-related information R1 and the second person-related information R2. Thus, in each embodiment below, the difference from the first embodiment will be mainly described.

Second Embodiment

Figure 15:
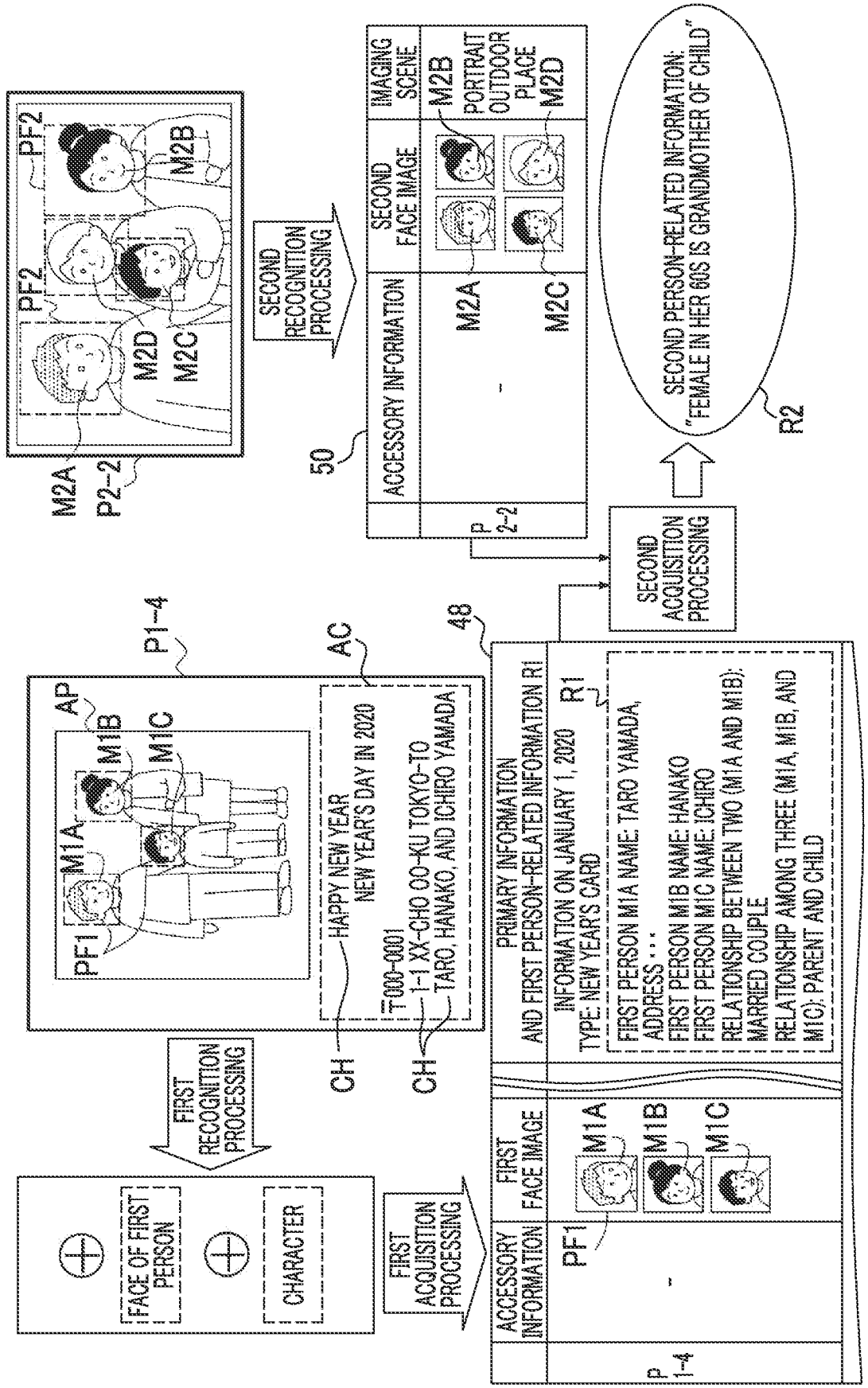
FIG. 15 is a schematic diagram illustrating a summary of a second embodiment.
Figure 16:
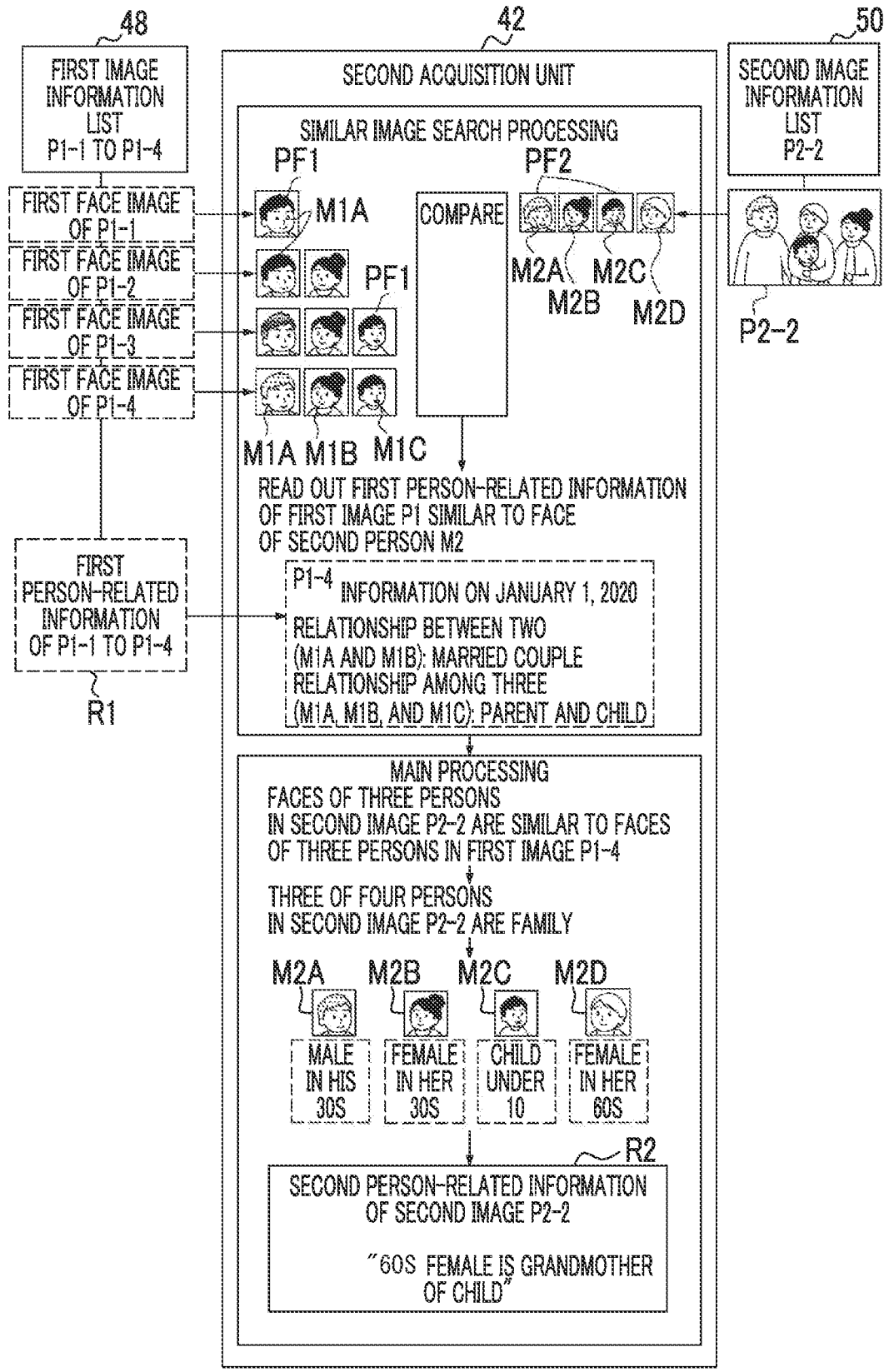
FIG. 16 is a description diagram illustrating an example of second acquisition processing of the second embodiment.

In a second embodiment illustrated in FIG. 15 and FIG. 16 as an example, the second person-related information R2 of the second image P2-2 is acquired using the first image P1-4. The first image P1-4 is the same as described in the first embodiment. Thus, processing performed on the first image P1-4 will not be described.

The second image P2-2 includes faces of four second persons M2. Thus, in the second recognition processing, the second recognition unit 38-2 recognizes the faces of the four second persons M2 from the second image P2-2 and extracts four recognized second face images PF2.

In the second acquisition processing illustrated in FIG. 16, in the similar image search processing, the second acquisition unit 42 searches for the first image P1 including the face of the first person M1 similar to the face of the second person M2 by comparing the second face image PF2 of each of the four second persons M2 included in the second image P2-2 with the first face image PF1 of each first person M1 included in the first image P1. The second acquisition unit 42 acquires the first person-related information R1 from the searched first image P1 from the first image information list 48. Even in the example in FIG. 16, the first image P1-1 to the first image P1-4 are searched as the first image P1 as in the example in FIG. 10 of the first embodiment. The first person-related information R1 of the first image P1-1 to the first image P1-4 is acquired.

In the example in FIG. 16, the faces of the three second persons M2A to M2C among four second persons M2A to M2D in the second image P2-2 are similar to the three first persons M1A to M1C in the first image P1-4. Based on this comparison result, the second acquisition unit 42 estimates that the three second persons M2A to M2C among the four second persons M2A to M2D in the second image P2-2 are a family in the main processing. Furthermore, the second acquisition unit 42 estimates who is the remaining second person M2D in the second image P2-2. The second acquisition unit 42 estimates ages and sexes of the second persons M2A to M2D by performing image analysis on the second image P2-2. In the present example, it is estimated that the second person M2A and the second person M2B are a male and a female in their 30s, the second person M2C is a child under 10, and the second person M2D is a female in her 60s. The ages of the second person M2A and the second person M2B are separated from the age of the second person M2D by approximately 20 or more, and the second person M2D is different from the first persons M1A to M1C recognized as being in a parent-child relationship included in the first person-related information R1. Thus, the second acquisition unit 42 estimates that the second person M2D is a grandmother of the second person M2C who is a child of the second person M2A and the second person M2B. Based on such estimation, the second person M2D is estimated as a "female in her 60s who is the grandmother of the child who is the second person M2C" in the second image P2-2. The second acquisition unit 42 acquires such an estimation result as the second person-related information R2.

The ages and the sexes of the four second persons M2 can also be estimated by performing image analysis on the second image P2-2. In the present example, the second person-related information R2 is acquired using the first person-related information R1 indicating that the first person M1A to the first person M1C similar to the second person M2A to the second person M2C are a family of three. The first person-related information R1 suppresses erroneous determination of the second person M2D as a mother of the second person M2C who is the child. That is, in this case, in the second acquisition processing, the second acquisition unit 42 derives the second person-related information R2 based on the second image P2 and determines validity of the derived second person-related information R2 based on the first person-related information R1. Accordingly, since the first person-related information R1 is information of high reliability, using the first person-related information R1 for determining the validity of the second person-related information R2 can acquire the second person-related information R2 of high reliability, compared to a case of simply acquiring the derived second person-related information R2.

In the present example, for example, the tag information such as "grandmother" can be assigned to the second image P2-2. Such tag information is convenient in a case of searching for a photo of "grandmother".

Third Embodiment

Figure 17:
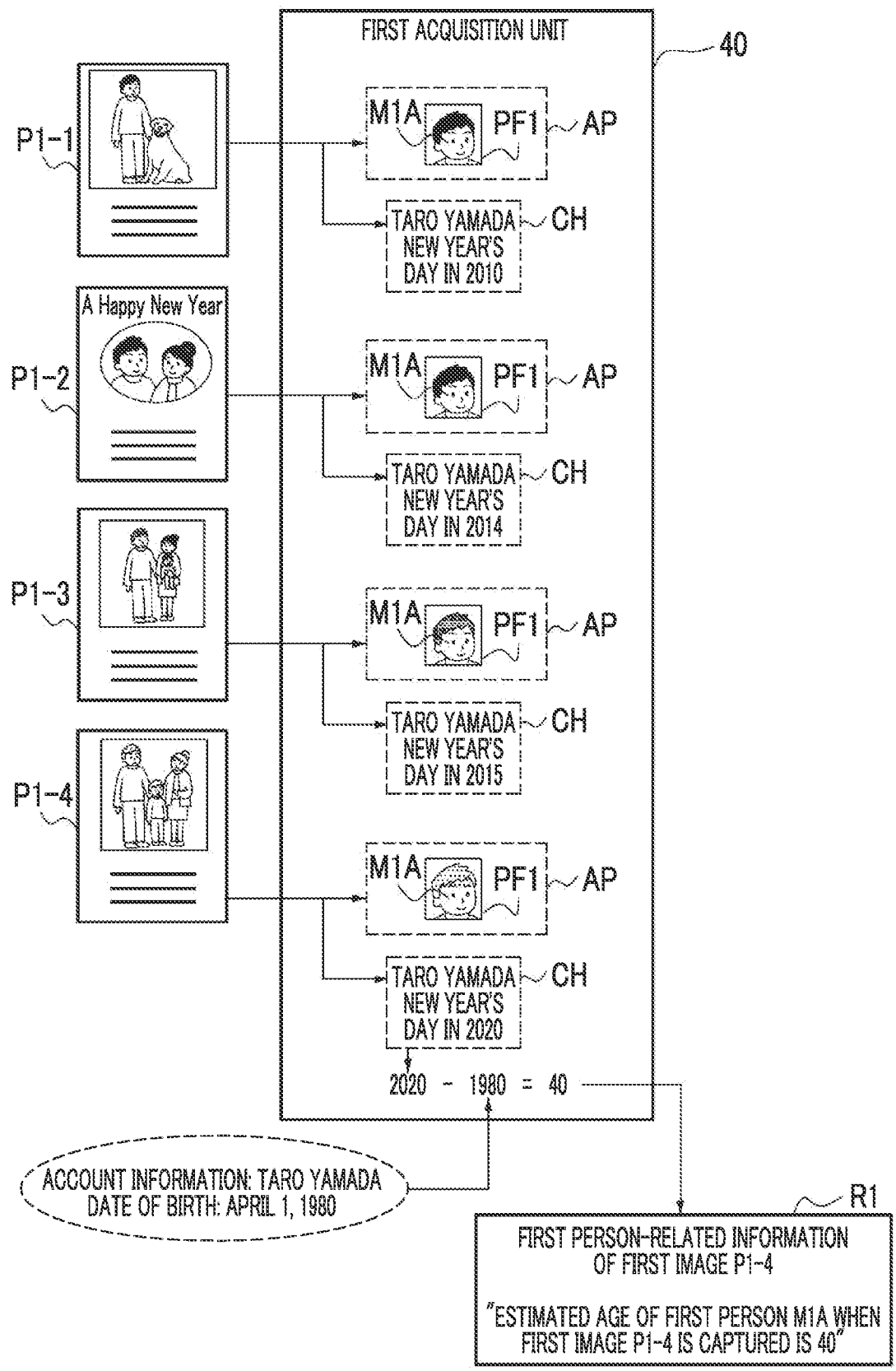
FIG. 17 is a description diagram illustrating an example of first acquisition processing of a third embodiment.
Figure 18:
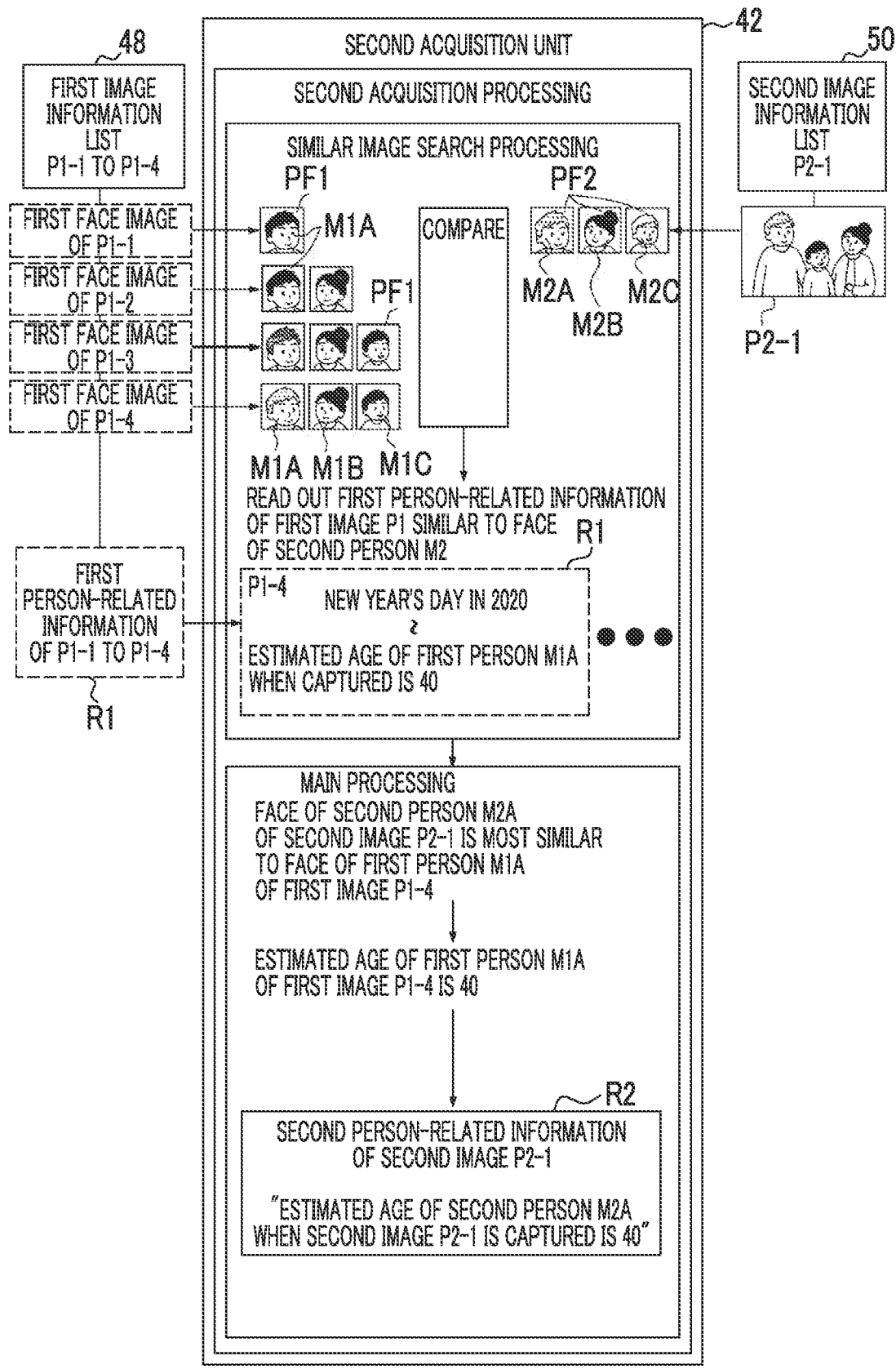
FIG. 18 is a description diagram illustrating an example of second acquisition processing of the third embodiment.

In a third embodiment illustrated in FIG. 17 and FIG. 18 as an example, the age of the second person M2A captured in the second image P2 is estimated using the account information of the user who is the owner of the first image P1, in addition to the first person-related information R1 acquired from the first image P1.

In the third embodiment, as illustrated in FIG. 18, the processing target second image P2 is the same second image P2-1 as the first embodiment, and the first image P1 searched by the similar image search processing is also the same first images P1-1 to P1-4 as the first embodiment (refer to FIG. 10).

As described in the first embodiment, an owner of the first images P1-1 to P1-4 is the user A, and the account information of the user A is registered at a time of signing a use contract for the online storage service. For example, the account information is stored in the storage region allocated to the user A in the storage 4. For example, the account information includes "Taro Yamada" that is the name of the user A, and information of Apr. 1, 1980 as a date of birth. The account information is information registered for each user and may be provided to each first image P1 as the EXIF information as a storage format. In addition, only one account information may be provided to a plurality of first images P1 of the same user. Either way, the account information is associated with the plurality of first images P1 of each user in the storage 4. The account information is an example of the accessory information attached to each first image P1 together with the EXIF information in a meaning of being associated.

In addition, as illustrated in FIG. 7, all of the first images P1-1 to P1-4 are New Year's cards, and all of the first images P1-1 to P1-4 include the face of the first person M1A and the character string CH of "Taro Yamada" in common. The face of the first person M1 included in the first image P1-1 is only the face of the first person M1A, and the name included in the first image P1-1 is only "Taro Yamada". In addition, in the first images P1-1 to P1-4, a date such as "New Year's Day in 2010" and "New Year's Day in 2014" that can be estimated as an approximate imaging year of the photo region AP is included as the character string CH.

As illustrated in FIG. 17, in the first acquisition processing executed for acquiring the first person-related information R1, the first acquisition unit 40 acquires the account information of the user A in addition to the character string CH included in the character region AC of the first image P1-1 to the first image P1-4. The face of the first person M1 included in all of the first images P1-1 to P1-4 in common is only the face of the first person M1A, and the character string CH included in all of the first images P1-1 to P1-4 in common is only "Taro Yamada". Thus, the first acquisition unit 40 estimates that the first person M1A is "Taro Yamada". Since "Taro Yamada" of the character string CH matches the name "Taro Yamada" of the account information, it is estimated that the first person M1A is the user A and the date of birth of the first person M1A is "Apr. 1, 1980" included in the account information.

In addition, as illustrated in FIG. 14 and the like, the first image P1-4 is "New Year's card", and the character string CH meaning the date "New Year's Day in 2020" is included in the first image P1-4. From this date, the first acquisition unit 40 estimates that the imaging year of the photo region AP of the first image P1-4 is around 2020. In a case where the imaging year of the photo region AP of the first image P1-4 is assumed to be 2020, the age of the first person M1A is estimated as approximately 40 since a year of birth of the first person M1A included in the first image P1-4 is 1980. Based on such estimation, the first acquisition unit 40 estimates the age of the first person M1A when the first image P1-4 is captured as approximately 40. While the estimated age of the first person M1A is information acquired using the account information, this information is acquired based on the face of the first person M1A and the character string CH of "New Year's Day in 2020" recognized from the first image P1-4. Thus, the estimated age of the first person M1A is an example of the first person-related information R1. In addition, the first acquisition unit 40 estimates the age of the first person M1A when each of the first images P1-1 to P1-3 is captured by performing the same estimation on the first images P1-1 to P1-3.

As illustrated in FIG. 18, in the main processing, the second acquisition unit 42 acquires a determination result indicating that the face of the second person M2A of the second image P2-1 is most similar to the face of the first person M1A of the first image P1-4 as a processing result of the similar image search processing. Furthermore, the second acquisition unit 42 acquires information indicating that the estimated age of the first person M1A is 40 from the first person-related information R1 of the first image P1-4. Based on this information, the second acquisition unit 42 acquires an estimation result indicating that an estimated age of the second person M2A of the second image P2-1 is 40 as the second person-related information R2.

In the third embodiment, in a case of estimating the age of the second person M2A of the second image P2-1, the second acquisition unit 42 searches for the first image P1-4 including a face similar to the face of the second person M2A of the second image P2-1 and acquires the second person-related information R2 of the estimated age of the second person M2A using the first person-related information R1 of the searched first image P1-4. Accordingly, using the first person-related information R1 of high reliability also improves reliability of the estimated age, compared to a case of estimating the age of the second person M2A from the second face image PF2.

For example, the estimated age may be in a certain degree of range such as 40s, early 40s, or 38 to 42.

In addition, in the present example, while an example in which the first acquisition unit 40 uses the account information in executing the first acquisition processing is described, the second acquisition unit 42 may use the account information in executing the second acquisition processing. For example, in the main processing in FIG. 18, as described above, a determination result indicating that the face of the second person M2A of the second image P2-1 is most similar to the face of the first person M1A of the first image P1-4 is acquired from the second acquisition unit 42. After acquiring this determination result, the second acquisition unit 42 may estimate the age of the first person M1A of the first image P1-4 and the age of the second person M2A of the second image P2-1 using the account information.

Fourth Embodiment

Figure 19:
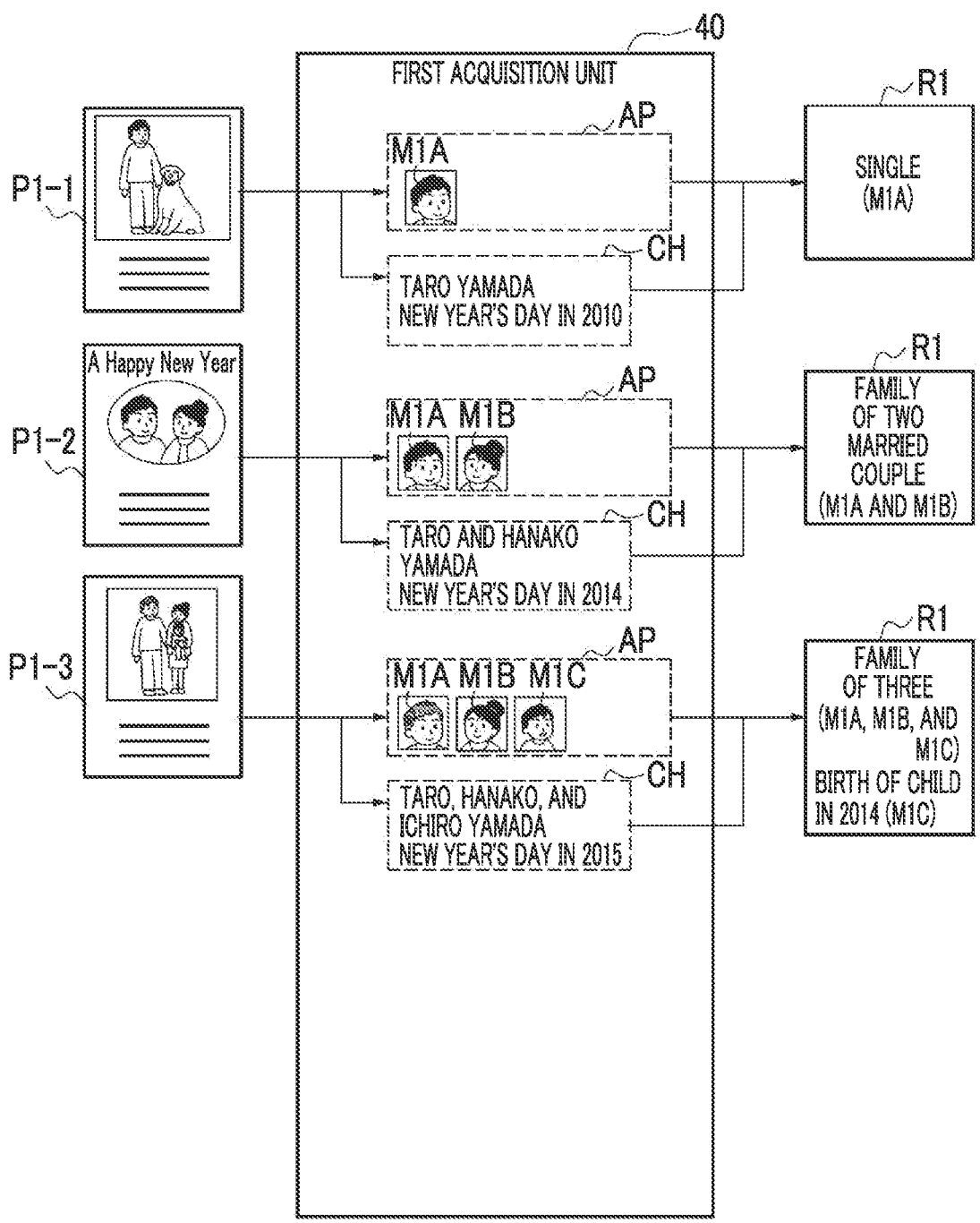
FIG. 19 is a description diagram illustrating an example of first acquisition processing of a fourth embodiment.
Figure 20:
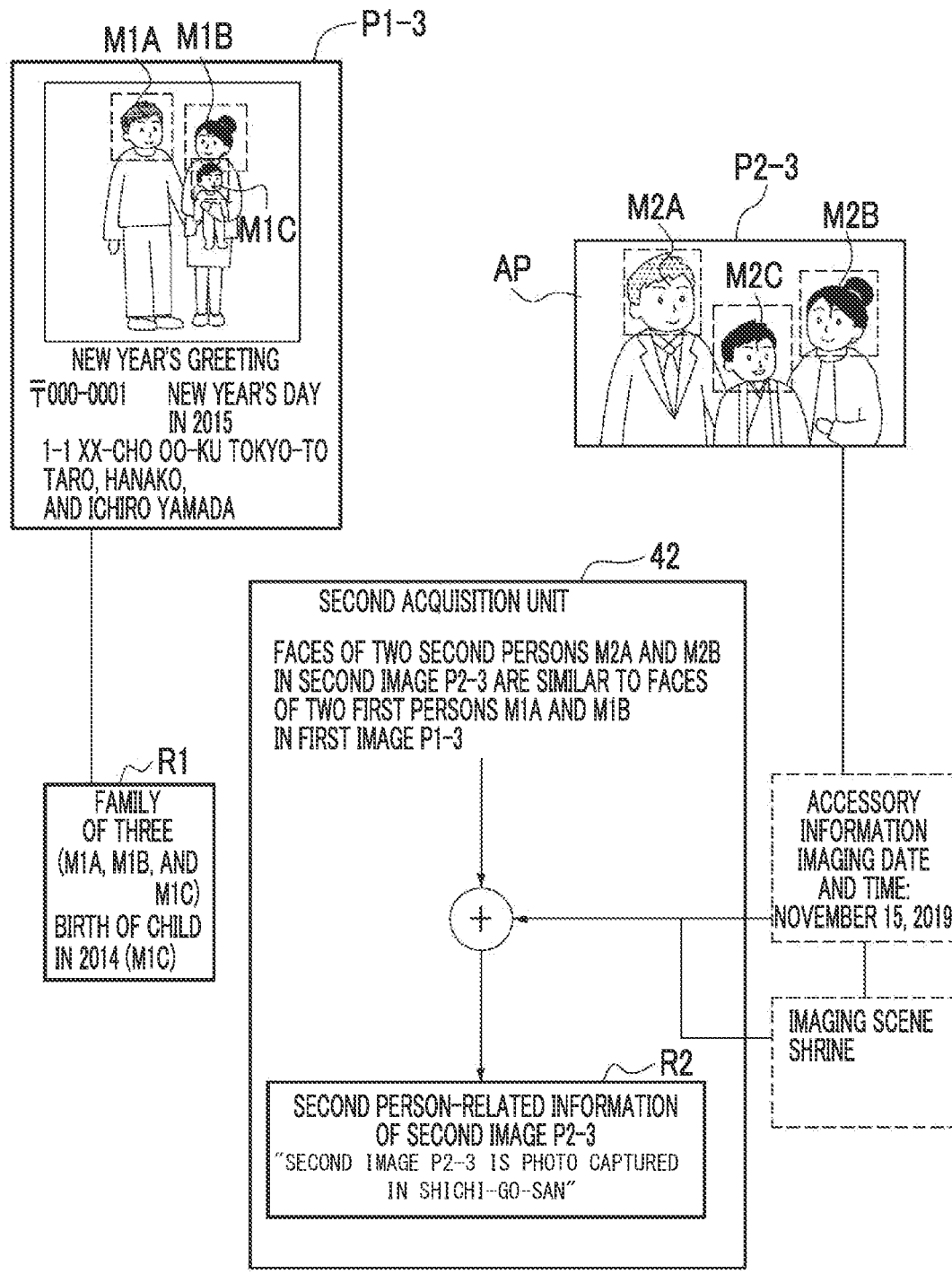
FIG. 20 is a description diagram illustrating an example of second acquisition processing of the fourth embodiment.

In a fourth embodiment illustrated in FIG. 19 and FIG. 20, the first acquisition unit 40 determines a year in which the number of persons of the family changes from the plurality of first images P1 and acquires the first person-related information R1 related to the change in the number of persons of the family The second acquisition unit 42 acquires the second person-related information R2 related to the second image P2 captured after the year using the first person-related information R1.

In the fourth embodiment, for example, as illustrated in FIG. 19, the first acquisition unit 40 acquires the change in the number of persons of the family of the first person M1A from the plurality of first images P1 of the user A as the first person-related information R1. The first images P1-1 to P1-3 are the same as the first images P1-1 to P1-3 illustrated in each of the embodiments (refer to FIG. 7 and FIG. 17). The first person M1A of "Taro Yamada" is captured alone in the photo region AP of the first image P1-1, and a date of 2010 is included as the character string CH. From such information, the first acquisition unit 40 acquires the first person-related information R1 indicating that the first person M1A is single in 2010 from the first image P1-1. As illustrated in FIG. 7, the first person-related information R1 indicating that the first persons M1A and M1B are a family of two in 2014 is acquired from the first image P1-2. The first person-related information R1 indicating that the first persons M1A, M1B, and M1C are a family of three in 2015 is acquired from the first image P1-3. Furthermore, in a case where the first person-related information R1 of the first image P1-2 is referred to, it is perceived that the first persons M1A and M1B are a family of two and the first person M1C does not exist in January 2014 that is one year ago. From this, it is perceived that the first person M1C included in the first image P1-3 is a child born in 2014. This information is also acquired as the first person-related information R1.

As illustrated in FIG. 20, in determining the image content of the second image P2-3, the second acquisition unit 42 searches for the first image P1-3 as the first image P1 including the face of the first person M1 similar to the face of the second person M2 included in the second image P2-3. The search is performed based on similarity between the faces of the second person M2A and M2B included in the second image P2-3 and the faces of the first persons M1A and M1B included in the first image P1-3. The second acquisition unit 42 reads out the first person-related information R1 related to the first image P1-3 from the first image information list 48.

In the main processing, the second acquisition unit 42 estimates that the age of the child (second person M2C) when the second image P2-3 is captured is 5 based on information "birth of child (first person M1C) in 2014" included in the first person-related information R1 of the first image P1-3 and information of the imaging year "2019" included in the accessory information of the second image P2-3. Furthermore, the second acquisition unit 42 estimates that the "second image P2-3 is a photo captured in Shichi-Go-San (an event for celebrating growth of 7-year-old girls, 5-year-old boys, and 3-year-old boys and girls)" based on a fact that an imaging date is "November 15" and the imaging scene of the second image P2-3 is "shrine". Such information is acquired as the second person-related information R2. Based on this second person-related information R2, for example, the tag information such as "Shichi-Go-San" is assigned to the second image P2-3.

As described above, according to the fourth embodiment, the first acquisition unit 40 determines the year in which the number of persons of the family is increased based on the plurality of first images P1-1 to P1-3 and acquires the year in which the number of persons of the family is increased as the first person-related information R1. The second acquisition unit 42 estimates the age of the child captured in the second image P2-3 acquired after the year by considering the year in which the number of persons of the family is increased as a year in which the child is born, and acquires the estimated age of the child as the second person-related information R2. Thus, according to the present configuration, various information can be acquired as the first person-related information R1, and furthermore, information of high reliability can be acquired as the second person-related information R2, compared to a case where the first person-related information R1 is acquired from only one first image P1.

Furthermore, based on the estimated age of the child, the imaging date, and the like, for example, the second image P2-3 is estimated as a memorial photo in an event such as Shichi-Go-San corresponding to the age of the child. According to the embodiment of the disclosed technology, since the first person-related information R1 is used, the second person-related information R2 of high reliability can be acquired, compared to a case where an event related to the second person M2 is estimated from only the image content of the second image P2.

Types of events related to the second person M2 with which the second image P2 is tagged include not only a traditional event such as Shichi-Go-San and miyamairi (an event for celebrating growth of an infant) for celebrating healthy growth of a child but also various events such as events of kanreki (60th birthday), beijyu (88th birthday), and the like for celebrating longevity, a life event such as a wedding ceremony and an admission ceremony, and a planned event such as a festival and a concert. In addition, the event includes a school event and the like such as a field day and a school play.

Fifth Embodiment

In each of the embodiments, while a New Year's card of which a sender is the user A is illustratively described as the first image P1 owned by the user A, the first image P1 owned by the user A may also be an image such as a New Year's card of which a recipient is the user A.

Figure 21:
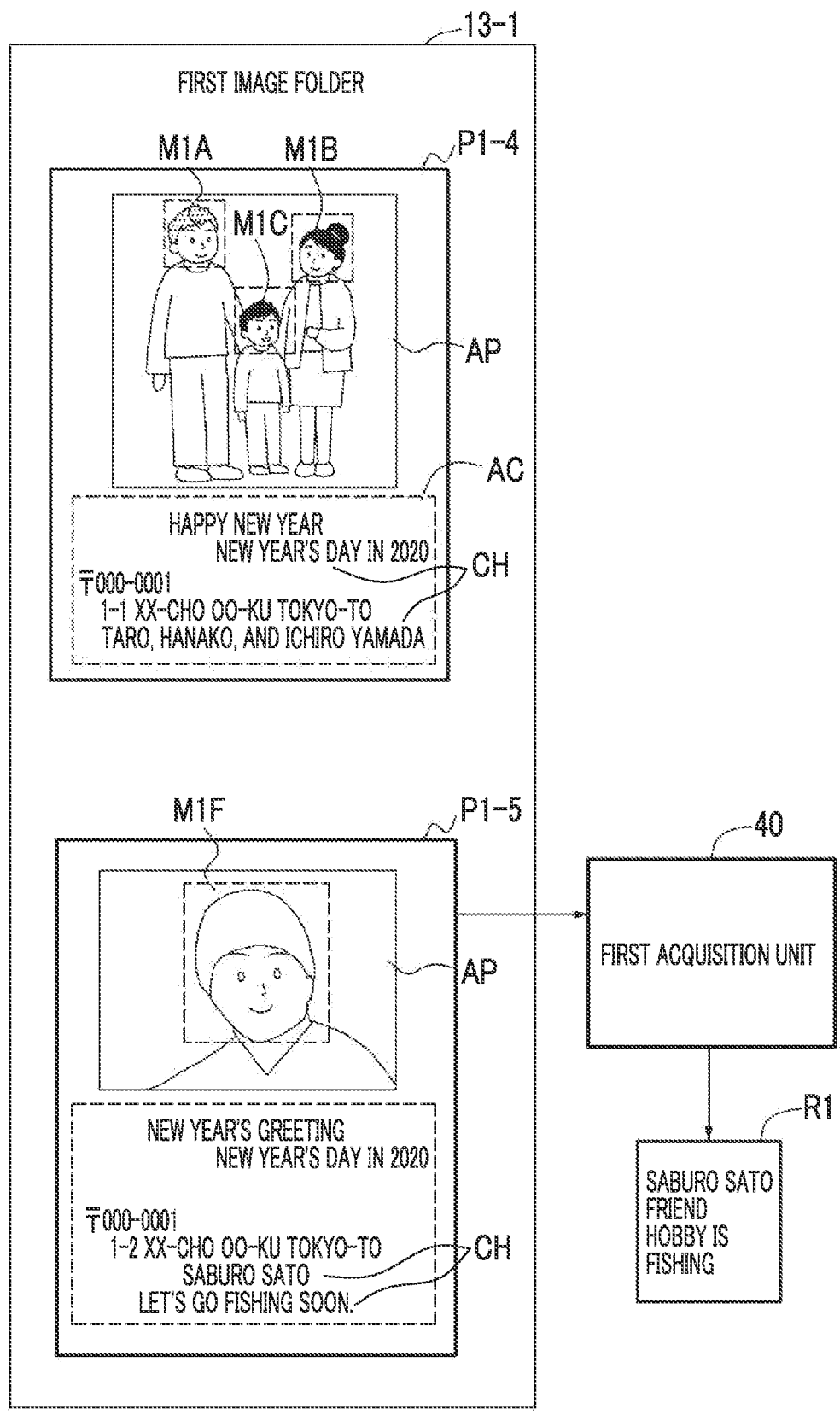
FIG. 21 is a description diagram illustrating an example of first acquisition processing of a fifth embodiment.
Figure 22:
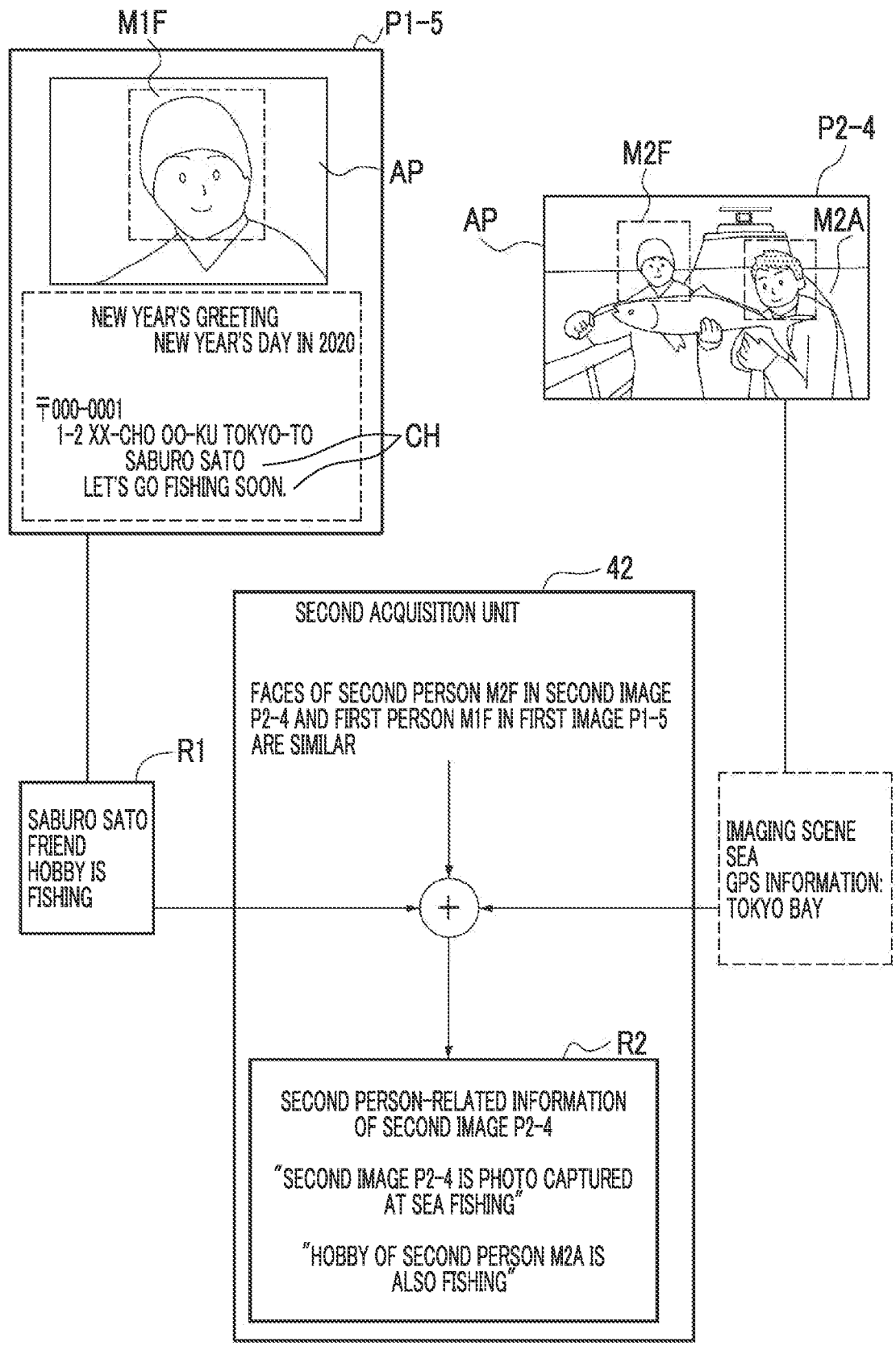
FIG. 22 is a description diagram illustrating an example of second acquisition processing of the fifth embodiment.

A fifth embodiment illustrated in FIG. 21 and FIG. 22 is an example of acquiring the second person-related information R2 from the second image P2 using the first person-related information R1 of the first image P1 of which a recipient is the user A.

As illustrated in FIG. 21, a first image P1-5 is an image of a New Year's card of which a recipient is the user A, and is stored in the first image folder 13-1 that is the folder of the user A together with the first image P1-4 of which the sender is the user A, and the like.

While the first image P1-4 of which the sender is the user A includes "Taro Yamada" that is the name of the user A as the sender, the first image P1-5 of which the recipient is the user A includes "Saburo Sato" in the name of the sender instead of "Taro Yamada". In addition, the character string CH of "New Year's greeting" and "Let's go fishing soon" is included in the character region AC of the first image P1-5.

In the first acquisition processing for the first image P1-5, the first acquisition unit 40 estimates that the first image P1-5 is "New Year's card" since "New Year's greeting" is included as the character string CH, and furthermore, estimates that a name of a first person M1F included in the photo region AP is "Saburo Sato" since the name of the sender is "Saburo Sato". In addition, the first acquisition unit 40 estimates that a hobby of the first person M1F of the first image P1-5 is "fishing" based on a message "Let's go fishing soon" included as the character string CH. In addition, since the first image P1-5 is stored as the first image P1-5 of "Taro Yamada" who is the user A, the first acquisition unit 40 estimates that the sender "Saburo Sato" is a friend of "Taro Yamada" who is the user A. The first acquisition unit 40 acquires this information as the first person-related information R1 of the first image P1-5.

As illustrated in FIG. 22, in the similar image search processing, the second acquisition unit 42 searches for the first image P1-5 based on similarity between faces of the second person M2F included in the processing target second image P2-4 and the first person M1F included in the first image P1-5. The second acquisition unit 42 acquires the first person-related information R1 of the searched first image P1-5.

In the main processing, the second acquisition unit 42 acquires the second person-related information R2 indicating that the "second image P2-4 is a photo captured at sea fishing" based on a fact that information "hobby is fishing" is present in the first person-related information R1 of the first image P1-5, the imaging scene of the second image P2-4 is "sea", and the GPS information indicates Tokyo Bay (refer to FIG. 9 as well). The imaging scene of the second image P2-4 is the sea, the GPS information indicates Tokyo Bay, and fish is also captured. Thus, in a case where image analysis is performed on the second image P2-4, it can be estimated that the second image P2-4 shows a state where two second persons M2A and M2F are fishing. Based on this estimation result, the second acquisition unit 42 can derive the second person-related information R2 indicating that hobbies of the two second persons M2A and M2F are fishing. The second acquisition unit 42 can determine the validity of the derived second person-related information R2 using the first person-related information RE Thus, reliability of the second person-related information R2 is improved.

Based on this second person-related information R2, for example, the tag information such as "sea: fishing" is assigned to the second image P2-4.

As described above, in the fifth embodiment, a New Year's card of which a recipient is the user A is used as the first image P1. In a case where a friend of the user A is captured as the first person M1 of the first image P1, the second acquisition unit 42 acquires the second person-related information R2 related to the friend from the second image P2-4 including a face of the friend using the first person-related information R1 related to the friend. Thus, according to the present configuration, for example, the second person-related information R2 of high reliability can be acquired, compared to a case of acquiring the second person-related information R2 related to the friend based on the first person-related information R1 of the user A.

Figure 23:
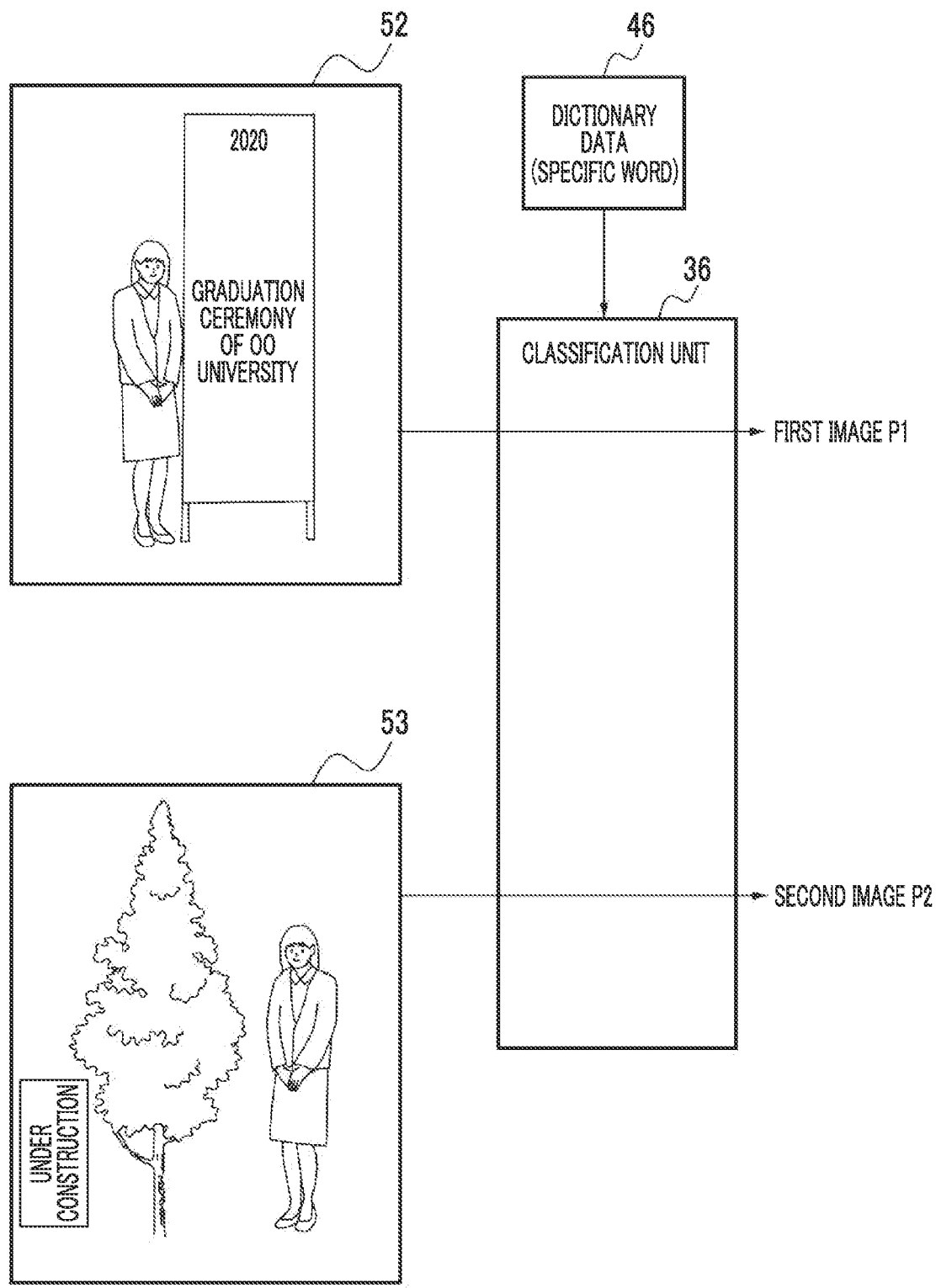
FIG. 23 is a description diagram of the classification processing based on whether or not a specific word is present.

In each of the embodiments, the character region-including image including the photo region AP and the character region AC is illustratively described as the first image P1. However, the first image P1 is not limited to the character region-including image and may be a character-captured image 52 as illustrated in FIG. 23 as an example. The character-captured image 52 is the character region non-including image of only the photo region AP in which the face of the first person is included, and is an image in which a specific word registered in advance as a character is captured in the photo region AP.

In the disclosed technology, in order to acquire the first person-related information R1 of high reliability, it is preferable that the first image P1 includes a character meaning information of high reliability related to the first person M1. As described in each of the embodiments, the character region-including image including the character region AC is considered to generally include a character meaning information of high reliability compared to the character region non-including image. However, in a case where a character meaning information considered to have high reliability is included in the photo region AP, it is preferable that the image P is positively used as the first image P1 even in a case where the character region AC is not present.

Examples of the specific word meaning information of high reliability related to the first person M1 include an admission ceremony, a graduation ceremony, a coming of age ceremony, a wedding ceremony, and a birthday celebration. Such a specific word has a high possibility of being usable as a word meaning various information such as an event related to the first person. For example, as in the character-captured image 52 in FIG. 23, in a case where the character-captured image 52 in which a character string "graduation ceremony of oo university" is included is used as the first image P1, the first acquisition unit 40 can acquire a university from which the first person M1 of the first image P1 graduates from the character-captured image 52. This information is said to have high reliability as the first person-related information R1. In addition, as illustrated in FIG. 23, in a case where a year of graduation such as "2020" is included as a character, the first acquisition unit 40 can acquire the year of graduation and use the acquired year of graduation for estimating an approximate age of the first person M1.

In the first embodiment, as illustrated in FIG. 4, the character-captured image 52 in FIG. 23 is classified as the second image P2 by the classification unit 36 since the character region AC is not present. In order to classify the character-captured image 52 as the first image P1, the following condition needs to be added to a condition under which the classification unit 36 classifies the image P as the first image P1. That is, a condition that the image P in which both of a face of a person and the specific word are included in the photo region AP is classified as the first image P1 even in a case where the character region AC is not present is added. Accordingly, the character-captured image 52 is classified as the first image P1.

For example, as illustrated in FIG. 23, a case where the character-captured image 52 including "graduation ceremony" that is the specific word, and a character-captured image 53 in which a character such as "under construction" is captured and the specific word is not included are present will be described. In the character-captured image 52, while the character region AC is not present, both of a face of a person and the specific word are included in the photo region AP. Thus, the classification unit 36 classifies the character-captured image 52 as the first image P1. On the other hand, in the character-captured image 53, the character region AC is not present, and the photo region AP includes only a face of a person and does not include the specific word. Thus, the classification unit 36 classifies the character-captured image 53 as the second image P2. The classification unit 36 determines whether or not the specific word is present by referring to the dictionary data 46 in which the specific word is registered in advance.

In addition, for example, the specific word may be a date printed on the printed photo PA (refer to FIG. 1). Furthermore, the first image is not limited to the character-captured image 52 and may be an image including the specific word handwritten on the printed photo PA. For example, the printed photo PA including the handwritten specific word refers to the printed photo PA on which the user writes a date such as "O month O day, 2010" and the specific word such as "graduation ceremony of OO" on the printed photo PA using a ball or the like in organizing the printed photo PA. Such handwritten information generally includes information related to a person captured in the photo. By using the image P with such a handwritten specific word as the first image P1, various first person-related information R1 of high reliability and furthermore, the second person-related information R2 of high reliability can be acquired, compared to a case of classifying the image P with the handwritten specific word as the second image P2.

In addition, the specific word may include a word or the like with which a greeting card can be determined, such as "Happy New Year" and "Merry Christmas". For example, even in a case of a greeting card such as a New Year's card or a Christmas card, the character region AC distinguished from the photo region AP may not be present. In this case, the specific word is generally included in the photo region AP. In a case where a word or the like with which a greeting card can be determined is registered as the specific word, a greeting card including only the photo region AP can be used as the first image P1.

In addition, in FIG. 23, an example of classifying the character-captured image 52 including the specific word as the first image P1 by determining whether or not the specific word is present in the character region non-including image such as the character-captured images 52 and 53 is described. However, not only the character region non-including image but also the character region-including image such as the first image P1-4 of a New Year's card illustrated in each of the embodiments may be classified as the first image P1 by determining the specific word. Since not all character region-including images have meaningful character information, the first image P1 not including meaningful character information can be excluded by determining whether or not the specific word is present.

In the embodiments, while an example of providing the classification unit 36 in the image content determination device 2 is described, the classification unit 36 may not be provided. For example, the image content determination device 2 may process the first image P1 and the second image P2 classified by another device.

In the embodiments, for example, various processors illustrated below can be used as a hardware structure of a computer executing various processing of the classification unit 36, the recognition unit 38, the first acquisition unit 40, the second acquisition unit 42, and the tagging unit 44 of the image content determination device 2. The various processors include, in addition to the CPU 18 that is a general-purpose processor functioning as various processing units by executing software (for example, the classification program 30, the recognition program 31, the first acquisition program 32, the second acquisition program 34, and the tagging program 35), a programmable logic device (PLD) that is a processor such as a field programmable gate array (FPGA) having a circuit configuration changeable after manufacturing, and/or a dedicated electric circuit or the like that is a processor such as an application specific integrated circuit (ASIC) having a circuit configuration dedicatedly designed to execute specific processing. A graphics processing unit (GPU) may be used instead of the FPGA.

One processing unit may be composed of one of the various processors or may be composed of a combination of two or more processors of the same type or different types (for example, a combination of a plurality of FPGAs and/or a combination of a CPU and an FPGA or a combination of a CPU and a GPU). In addition, a plurality of processing units may be composed of one processor.

A first example of the plurality of processing units composed of one processor is, as represented by a computer such as a client and a server, a form in which one processor is composed of a combination of one or more CPUs and software, and the processor functions as the plurality of processing units. A second example is, as represented by a system on chip (SOC) and the like, a form of using a processor that implements functions of the entire system including the plurality of processing units in one integrated circuit (IC) chip. Accordingly, various processing units are configured using one or more of the various processors as a hardware structure.

Furthermore, more specifically, an electric circuit in which circuit elements such as semiconductor elements are combined can be used as a hardware structure of the various processors.

Figure 24:
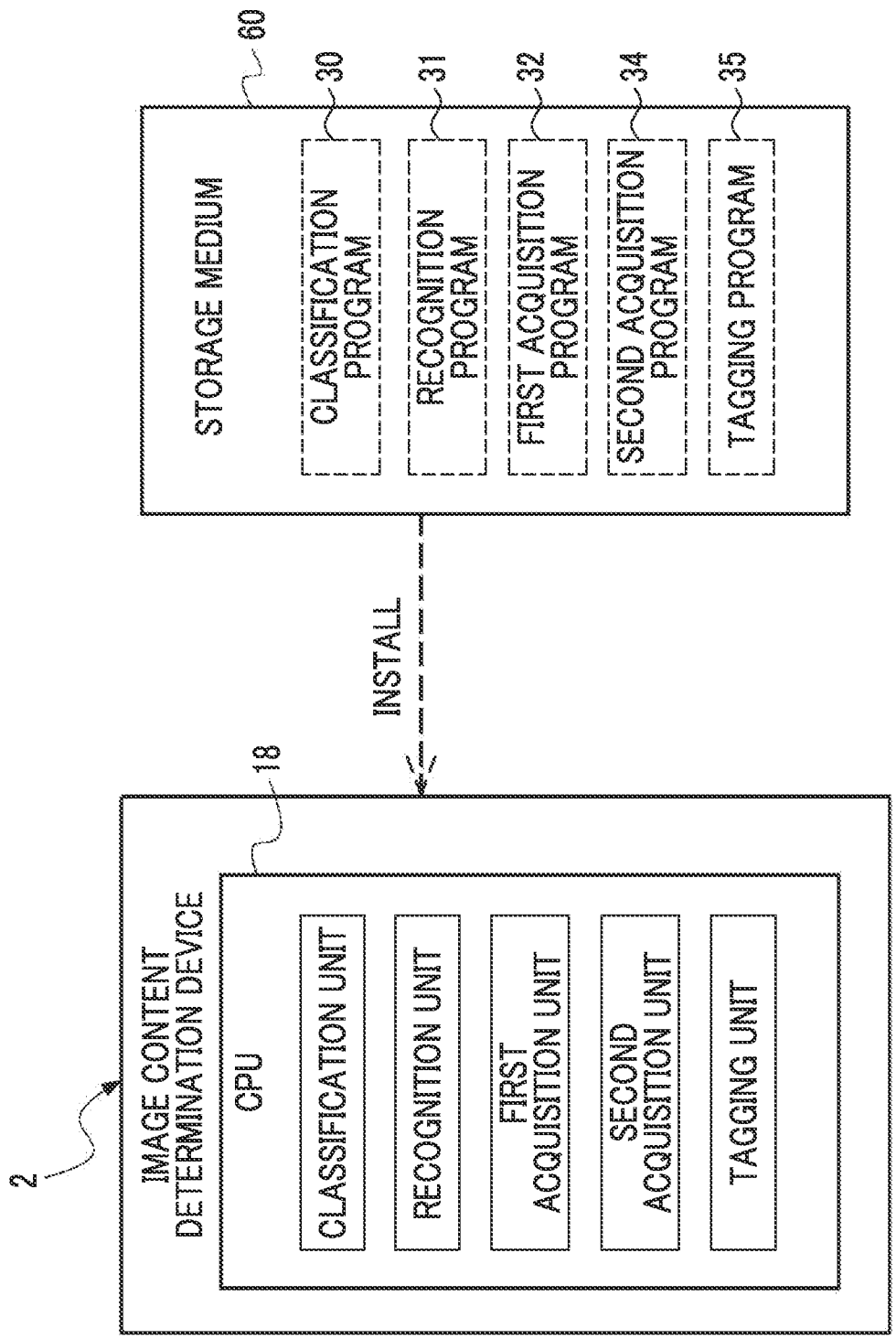
FIG. 24 is a description diagram illustrating an example of installing a program stored in a storage medium on the image content determination device.

In addition, in the first embodiment, while various programs including the classification program 30, the recognition program 31, the first acquisition program 32, the second acquisition program 34, and the tagging program 35 are stored in the program memory 22, the disclosed technology is not limited thereto. The various programs may be stored in any portable storage medium such as an SSD or a universal serial bus (USB) memory in the same manner as in the storage 4 illustrated in FIG. 2. In this case, as illustrated in FIG. 24 as an example, the various programs stored in a storage medium 60 are connected to and installed on the image content determination device 2 in the same manner as in the storage 4. The CPU 18 executes the classification processing, the first recognition processing, the first acquisition processing, the second recognition processing, the second acquisition processing, and the tagging processing in accordance with the installed various programs.

In addition, in the same manner as in the storage 4, the various programs may be stored in a storage unit of another computer, a server apparatus, or the like connected to the image content determination device 2 through the communication network N (refer to FIG. 1). The various programs may be downloaded to the image content determination device 2 in accordance with a request from the image content determination device 2. In this case, the CPU 18 executes the classification processing, the first recognition processing, the first acquisition processing, the second recognition processing, the second acquisition processing, and the tagging processing in accordance with the downloaded various programs.

As described in the embodiments, contents of the following appendices may be added to the image content determination device according to the embodiment of the present disclosure.

[Appendix 1]

The first image may include a character region-including image including a photo region in which the face of the first person is included, and a character region that is a blank outside an outline of the photo region and in which the character is arranged, and the second image may be a character region non-including image of only a photo region in which the face of the second person is included.

[Appendix 2]

The first image may be an image representing at least one of a greeting card or an identification document.

[Appendix 3]

The first image may include a character-captured image that is a character region non-including image of only a photo region in which the face of the first person is included, and in which a specific word registered in advance as the character is captured in the photo region.

[Appendix 4]

The first image may include a specific word registered in advance as the character.

[Appendix 5]

The processor may be configured to execute classification processing of classifying a plurality of images into the first image and the second image.

[Appendix 6]

The first person-related information may be acquired from the first image of the same owner as the second image.

[Appendix 7]

The first person-related information may include at least one of a name, an address, a telephone number, an age, a date of birth, or a hobby of the first person.

[Appendix 8]

The processor may be configured to use accessory information attached to the first image or the second image in at least one of the first acquisition processing or the second acquisition processing.

[Appendix 9]

In the second acquisition processing, the processor may be configured to derive the second person-related information based on the second image and determine validity of the derived second person-related information based on the first person-related information.

[Appendix 10]

The second person-related information may be at least one of an event related to the second person or an estimated age of the second person.

[Appendix 11]

In a case where faces of a plurality of the first persons are included in the first image, the first person-related information may include information indicating a relationship among the plurality of first persons, and/or in a case where faces of a plurality of the second persons are included in the second image, the second person-related information may include information indicating a relationship among the plurality of second persons.

[Appendix 12]

The information indicating the relationship among the plurality of first persons or the information indicating the relationship among the plurality of second persons may include at least one of a family relationship, a relative relationship, or a friend relationship.

[Appendix 13]

The processor may be configured to use the first person-related information corresponding to a plurality of the first images for acquiring the second person-related information in the second acquisition processing.

Various embodiments and/or various modification examples described above can be appropriately combined in the disclosed technology. In addition, the disclosed technology is not limited to the embodiments and may employ various configurations without departing from the gist thereof. Furthermore, the disclosed technology also applies to, in addition to the program, a storage medium that stores the program in a non-transitory manner.

Above described contents and illustrated contents are detailed descriptions for parts according to the embodiment of the disclosed technology and are merely an example of the disclosed technology. For example, description related to the above configurations, functions, actions, and effects is description related to an example of configurations, functions, actions, and effects of the parts according to the embodiment of the disclosed technology. Thus, unnecessary parts may be removed, new elements may be added, or parts may be replaced in the above described contents and the illustrated contents without departing from the gist of the disclosed technology. In addition, particularly, description related to common technical knowledge or the like that does not need to be described in terms of embodying the disclosed technology is omitted in the above described contents and the illustrated contents in order to avoid complication and facilitate understanding of the parts according to the embodiment of the disclosed technology.

In the present specification, "A and/or B" has the same meaning as "at least one of A or B". This means that "A and/or B" may be only A, only B, or a combination of A and B. In addition, in the present specification, the same approach as "A and/or B" is applied to a case where three or more matters are represented by connecting the matters with "and/or".

The disclosure of Japanese Patent Application No. 2020-058617 filed on Mar. 27, 2020 is incorporated in the present specification by reference in its entirety. In addition, all documents, patent applications, and technical standards disclosed in the present specification are incorporated in the present specification by reference to the same extent as in a case where each of the documents, patent applications, technical standards are specifically and individually indicated to be incorporated by reference.

What is claimed is:

1. An image content determination device comprising:
at least one processor; and
at least one storage,
wherein the storage is configured to store an unprocessed folder stored with a first original image which includes a character as a part of the first original image and a face of a first person, and a second original image which does not include a character as a part of the second original image but includes a face of a second person, and a processed folder;
wherein the processor is configured to:
execute first recognition processing of recognizing the character and the face of the first person from the first original image,
execute first acquisition processing of estimating first person-related information related to the first person included in the first original image based on the recognized character and the face of the first person, tagging the first original image with the estimated first person- related information, and storing, in the processed folder, a tagged first image which is the first original image with the first person-related information being tagged to the first original image,
execute second recognition processing of recognizing the face of the second person from the second original image,
execute a retrieval processing for acquiring an image list including a plurality of the first original images each of which includes the face of the first person that is similar to the face of the second person included in the second original image, and as part of the first acquisition processing, an estimation processing of estimating the plurality of first person-related information based on information estimated by combining the plurality of first person-related information tagged to the plurality of first original images included in the image list, and
execute second acquisition processing of estimating second person-related information related to the second person included in the second original image, in which the second person-related information is estimated using the plurality of first person-related information that has been estimated based on the estimation processing, extracting a keyword from the estimated second person-related information, tagging the second original image with the estimated second person-related information and the keyword extracted from the second person-related information, and storing, in the processed folder, a tagged second image which is the second original image with the second person-related information and the keyword being tagged to the second original image,
wherein the first acquisition processing chronologically arranges the plurality of first original images in the image list and updates the plurality of first person-related information based on chronological changes in the plurality of first person-related information tagged to the plurality of first original images and the information about the first person estimated based on the chronological changes.

2. The image content determination device according to claim 1,
wherein the first original image includes a character region-including image including a photo region in which the face of the first person is included, and a character region that is a blank outside an outline of the photo region and in which the character is arranged, and
the second original image is a character region non-including image of only a photo region in which the face of the second person is included.

3. The image content determination device according to claim 1,
wherein the first original image includes an image representing at least one of a greeting card or an identification document.

4. The image content determination device according to claim 1,
wherein the first original image includes a character-captured image that is a character region non-including image of only a photo region in which the face of the first person is included, and in which a specific word registered in advance as the character is captured in the photo region.

5. The image content determination device according to claim 1,
wherein the first original image includes a specific word registered in advance as the character.

6. The image content determination device according to claim 1,
wherein the processor is configured to execute classification processing of classifying a plurality of images into the first original image and the second original image.

7. The image content determination device according to claim 1,
wherein the first person-related information is acquired from the first original image owned by the same owner as the second original image.

8. The image content determination device according to claim 1,
wherein the first person-related information includes at least one of a name, an address, a telephone number, an age, a date of birth, or a hobby of the first person.

9. The image content determination device according to claim 1,
wherein the processor is configured to use accessory information attached to the first original image or the second original image in at least one of the first acquisition processing or the second acquisition processing.

10. The image content determination device according to claim 9,
wherein in the second acquisition processing, the processor is configured to derive the second person-related information based on the second original image and determine validity of the derived second person-related information based on the first person-related information.

11. The image content determination device according to claim 1,
wherein the second person-related information is at least one of an event related to the second person or an estimated age of the second person.

12. The image content determination device according to claim 1,
wherein in a case where faces of a plurality of the first persons are included in the first original image, the first person-related information includes information indicating a relationship among the plurality of first persons, and/or in a case where faces of a plurality of the second persons are included in the second original image, the second person-related information includes information indicating a relationship among the plurality of second persons.

13. The image content determination device according to claim 12,
wherein the information indicating the relationship among the plurality of first persons or the information indicating the relationship among the plurality of second persons includes at least one of a family relationship, a relative relationship, or a friend relationship.

14. The image content determination device according to claim 1,
wherein the processor is configured to use the first person-related information that is tagged to a plurality of the first original images for estimating the second person-related information in the second acquisition processing.

15. The image content determination device according to claim 1, wherein
the first acquisition processing further comprises storing, in the processed folder, the first person-related information and first other information specific to the first original image that is extracted from the first original image, the first person-related information and the first other information being tagged to the first original image, and
the second acquisition processing further comprises estimating the second person-related information and second other information specific to the second original image using the first person-related information and the first other information and storing, in the processed folder, the second person-related information and the second other information, the second person-related information and the second other information being tagged to the second original image.

16. An image content determination method comprising:
storing, in at least one storage, an unprocessed folder stored with a first original image which includes a character as a part of the first original image and a face of a first person, and a second original image which does not include a character as a part of the second original image but includes a face of a second person, and a processed folder;
executing first recognition processing of recognizing the character and the face of the first person from the first original image;
executing first acquisition processing of estimating first person-related information related to the first person included in the first original image based on the recognized character and the face of the first person, tagging the first original image with the estimated first person-related information, and storing, in the processed folder, a tagged first image which is the first original image with the first person-related information being tagged to the first original image;
executing second recognition processing of recognizing the face of the second person from the second original image;
execute a retrieval processing for acquiring an image list including a plurality of the first original images each of which includes the face of the first person that is similar to the face of the second person included in the second original image, and as part of the first acquisition processing, an estimation processing of estimating the plurality of first person-related information based on information estimated by combining the plurality of first person-related information tagged to the plurality of first original images included in the image list, and
executing second acquisition processing of estimating second person-related information related to the second person included in the second original image, in which the second person-related information is estimated using the plurality of first person-related information that has been estimated based on the estimation processing, extracting a keyword from the estimated second person-related information, tagging the second original image with the estimated second person-related information and the keyword extracted from the second person-related information, and storing, in the processed folder, a tagged second image which is the second original image with the second person-related information and the keyword being tagged to the second original image, wherein the first acquisition processing chronologically arranges the plurality of first original images in the image list and updates the plurality of first person-related information based on chronological changes in the plurality of first person-related information tagged to the plurality of first original images and the information about the first person estimated based on the chronological changes.

17. A non-transitory computer-readable storage medium storing an image content determination program executable by a computer including at least one processor to perform a process comprising:

storing, in at least one storage, an unprocessed folder stored with a first original image which includes a character as a part of the first original image and a face of a first person, and a second original image which does not include a character as a part of the second original image but includes a face of a second person, and a processed folder;

executing first recognition processing of recognizing the character and the face of the first person from the first original image;

executing first acquisition processing of estimating first person-related information related to the first person included in the first original image based on the recognized character and the face of the first person, tagging the first original image with the estimated first person-related information, and storing, in the processed folder, a tagged first image which is the first original image with the first person-related information being tagged to the first original image;

executing second recognition processing of recognizing the face of the second person from the second original image;

execute a retrieval processing for acquiring an image list including a plurality of the first original images each of which includes the face of the first person that is similar to the face of the second person included in the second original image, and as part of the first acquisition processing, an estimation processing of estimating the plurality of first person-related information based on information estimated by combining the plurality of first person-related information tagged to the plurality of first original images included in the image list, and executing second acquisition processing of estimating second person-related information related to the second person included in the second original image, in which the second person- related information is estimated using the plurality of first person-related information that has been estimated based on the estimation processing, extracting a keyword from the estimated second person-related information, tagging the second original image with the estimated second person-related information and the keyword extracted from the second person-related information, and storing, in the processed folder, a tagged second image which is the second original image with the second person-related information and the keyword being tagged to the second original image, wherein the first acquisition processing chronologically arranges the plurality of first original images in the image list and updates the plurality of first person-related information based on chronological changes in the plurality of first person-related information tagged to the plurality of first original images and the information about the first person estimated based on the chronological changes.

* * * * *